US008094241B2

(12) United States Patent
Nishi

(10) Patent No.: US 8,094,241 B2
(45) Date of Patent: Jan. 10, 2012

(54) DIGITAL BROADCAST RECEPTION DEVICE AND RELATED METHOD TO DETERMINE PROGRAMS INCLUDED IN RECEIVABLE PROGRAMS

(75) Inventor: Tatsuya Nishi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1107 days.

(21) Appl. No.: 11/576,188

(22) PCT Filed: Sep. 28, 2005

(86) PCT No.: PCT/JP2005/017841
§ 371 (c)(1),
(2), (4) Date: Mar. 28, 2007

(87) PCT Pub. No.: WO2006/035812
PCT Pub. Date: Apr. 6, 2006

(65) Prior Publication Data
US 2007/0242783 A1     Oct. 18, 2007

(30) Foreign Application Priority Data
Sep. 30, 2004 (JP) .................................. 2004-288389

(51) Int. Cl.
*H04N 5/50* (2006.01)
*H04N 5/445* (2011.01)
*H04N 5/91* (2006.01)
(52) U.S. Cl. ........... 348/732; 348/731; 725/58; 386/291
(58) Field of Classification Search .................. 348/742, 348/731, 838, 180, 192; 386/291, 293, 296; 725/58
See application file for complete search history.

(56) References Cited

U.S. PATENT DOCUMENTS

| 5,280,642 A | 1/1994 | Hirata et al. |
| 5,539,451 A * | 7/1996 | Carey et al. .................... 725/138 |
| 6,209,131 B1 * | 3/2001 | Kim et al. ........................ 725/50 |
| 6,751,401 B1 * | 6/2004 | Arai et al. ...................... 386/291 |

(Continued)

FOREIGN PATENT DOCUMENTS

DE     3938268 C1     1/1991

(Continued)

OTHER PUBLICATIONS

Machine Translation of Itsuki Isamu, Channel Selction System for Television Reciever, Feb. 25, 2000, Japan Patent Office, Publication No. 2000-059706.*

(Continued)

*Primary Examiner* — Victor Kostak
(74) *Attorney, Agent, or Firm* — Seed IP Law Group PLLC

(57) ABSTRACT

There is disclosed a digital broadcast reception device capable of acquiring a broadcast wave at a current position with a high probability without using position information even when moving over a broadcast area. In this device, when reservation of recording or viewing is inputted from an input unit (104), a broadcast wave which can be received by the frequency channel for which the frequency channel station selection unit (123) is specified is selected. When it is impossible to select a broadcast wave which can be received by the specified frequency channel, a station selection control unit (122) controls the frequency channel station selection unit (123), a broadcast analysis unit (124), and a service channel station selection unit (125) so as to perform channel search and acquire a broadcast wave which can be received.

14 Claims, 17 Drawing Sheets

U.S. PATENT DOCUMENTS

| | | | |
|---|---|---|---|
| 6,774,926 B1 * | 8/2004 | Ellis et al. | 348/14.01 |
| 2003/0078000 A1 | 4/2003 | Tatsumi et al. | |
| 2003/0210485 A1 * | 11/2003 | Shirato | 360/1 |
| 2004/0158851 A1 * | 8/2004 | Unemura | 725/28 |
| 2006/0277570 A1 * | 12/2006 | Seo | 725/37 |

FOREIGN PATENT DOCUMENTS

| | | |
|---|---|---|
| EP | 0433596 A2 | 6/1991 |
| EP | 0836320 A2 | 10/1997 |
| JP | 4100307 A | 4/1992 |
| JP | 2000059706 | 2/2000 |
| JP | 2003189267 | 7/2003 |
| JP | 2003230081 | 8/2003 |
| JP | 2004023111 | 1/2004 |
| JP | 2005184316 | 7/2005 |
| JP | 2005236453 | 9/2005 |

OTHER PUBLICATIONS

Machine Translation of Kawai Yoshifumi, Program Reservation Apparatus for Digital Broadcasst Reciever, Aug. 15, 2003, Japan Patent Office, Publication No. 2003-230081.*

PCT International Search Report dated Jan. 10, 2006.

Office Action for Corresponding European Application No. 05788401.7, dated Mar. 31, 2011, 4 pages.

European Search Report for corresponding EP Application No. 05788401.7, mailed Mar. 25, 2011, 3 pages.

* cited by examiner

DIGITAL BROADCAST RECEPTION DEVICE AND RELATED METHOD TO DETERMINE PROGRAMS INCLUDED IN RECEIVABLE PROGRAMS

TECHNICAL FIELD

The present invention relates to a digital broadcast receiving apparatus.

BACKGROUND ART

Small portable terminals such as mobile phones enabling TV viewing and recording are becoming increasingly popular, and if a user can receive TV waves while moving, or at the user's destination, it is possible to view and record TV broadcasts without restrictions as to location.

In terrestrial digital broadcasting, it is planned to provide a data broadcasting service to such small portable terminals by allocating one of 13 divisions of a channel band (6 MHz) (one segment). This data broadcasting service is called partial reception broadcasting. The amount of information transmitted in one segment is extremely small, and program information and so forth for only ten programs at the most can be included. PSI (Program Specific Information) and SI (Service Information) are known as program information. PSI is information necessary for selecting a desired program, while SI comprises various kinds of information stipulated to make program selection more convenient, including information related to EPG (Electronic Program Guide) such as program names, broadcasting station names, and so forth.

Also, in terrestrial digital broadcasting, when a broadcasting station multiplexes a plurality of data comprising video, audio, and other program information into a single stream, the MPEG protocol MPEG-2 TS (Transport Stream) is used, the multiplexed stream is demultiplexed on the receiving side, and the data prior to multiplexing is obtained. When "TS" alone is referred to below in this Description, this means all partial reception broadcasting data sent by a broadcasting station.

As a plurality of data can be multiplexed in digital broadcasting in this way, unlike analog broadcasting, a plurality of channels can be operated in one frequency band. To avoid confusion and erroneous use, the concept of a channel as used in this Description will be defined here. Channels include physical channels and logical channels, with physical channels also being used in analog broadcasting. A physical channel is a physical frequency assignment channel (hereinafter referred to as "frequency channel"). In terrestrial digital broadcasting, frequency channels from ch13 to ch62 are assigned. A logical channel identifies a plurality of program schemes (hereinafter referred to as "services") within a frequency channel, and is called a service channel. Such frequency channels and service channels are referred to as channels generically.

The above-described frequency channels are assigned one-touch button numbers on a remote controller or the like for easy identification, these numbers being called remote controller numbers. When channel selection (station selection, tuning) is performed by means of a remote controller number, a main service called "primary service" is selected from among a plurality of service channels included in one frequency channel. A number that is calculated from this remote controller number and the service channel value, whereby a user directly specifies a service within a frequency channel, is called a 3-digit number.

For reference, channel definitions are shown conceptually in FIG. 1. In FIG. 1, a TS is composed of three services and program information comprising PSI information and SI information, service ID: D9A0 (primary service) performs general broadcasting, service ID: D9A1 performs English broadcasting, and service ID: D9A2 performs data broadcasting, with programs A through F being broadcast by these services. An example is shown in which the frequency channel is ch21, the remote controller number is 8, the 3-digit numbers are 681, 682, and 683, and the service IDs are D9A0, D9A1, and D9A2.

Generally, with a non-portable TV recording apparatus, if a remote controller number, recording start time, and recording end time are set in recording preselection, a desired program can be recorded. In contrast, with a portable TV recording apparatus, if recording preselection is performed in a particular broadcast area, and the portable TV recording apparatus moves to another broadcast area before the recording start time, it may not be possible to record the desired program even though a remote controller number, recording start time, and recording end time are set in recording preselection.

Thus, the invention disclosed in Patent Document 1 was devised. FIG. 2 is a block diagram showing the configuration of a portable TV recording apparatus 10 described in Patent Document 1. In this drawing, the current location of portable TV recording apparatus 10 is detected by an extension module 11 provided with a GPS (Global Positioning System) function. Then portable TV recording apparatus 10 makes an inquiry to a program information server 14 from a communication section 12 via a public circuit 13, receives a supply of program information from program information server 14 that holds program information comprising areas in which programs are broadcast, program IDs, channel numbers, broadcast start times, and broadcast durations, determines whether or not broadcast channel information and broadcast time information at the current location differ from those at the time of preselection, and if they differ, updates the preselection information. If a preselected program is not broadcast at the current location, the preselection-time program is recorded by a VTR 15.

By this means, a preselected program can be recorded dependably even if a portable TV recording apparatus moves beyond a broadcast area between the time of preselection and the recording start time. Patent Document 1: Unexamined Japanese Patent Publication No. 2004-23111

DISCLOSURE OF INVENTION

Problems to be Solved by the Invention

However, with the portable TV recording apparatus described in above Patent Document 1, it is necessary to construct a database that handles nationwide broadcasting stations and location information and includes the respective program information, and to perform information updating and management, with the result that provision of the service described in Patent Document 1 is demanding in terms of effort and cost. When a preselected program is not broadcast at the current location, although the preselected program can be recorded dependably by recording the preselection-time program by means of VTR 15, there is no assumption of performing recording on a portable TV recording apparatus while away from home, or viewing a recorded program on a portable TV recording apparatus while away from home. Furthermore, the incorporation of GPS capability increases the scale and cost of the apparatus.

It is an object of the present invention to provide a digital broadcast receiving apparatus that acquires a broadcast wave at the current location with a high degree of probability without using location information, even when moving beyond a broadcast area.

Means for Solving the Problems

A digital broadcast receiving apparatus of the present invention employs a configuration that includes: a frequency channel selection section that receives a viewable broadcast wave on a frequency channel specified when recording or viewing is preselected, or prior to the start of preselection execution; and a channel search section that, if a viewable broadcast wave cannot be received on a frequency channel specified by the frequency channel selection section, performs a channel search, and acquires a frequency channel of a viewable broadcast wave.

Advantageous Effect of the Invention

According to the present invention, a digital broadcast receiving apparatus can be provided that acquires a broadcast wave at the current location with a high degree of probability without using location information, even when moving beyond a broadcast area.

BEST MODE FOR CARRYING OUT THE INVENTION

Embodiments of the present invention will now be described in detail with reference to the accompanying drawings.

Embodiment 1

Figure 1:
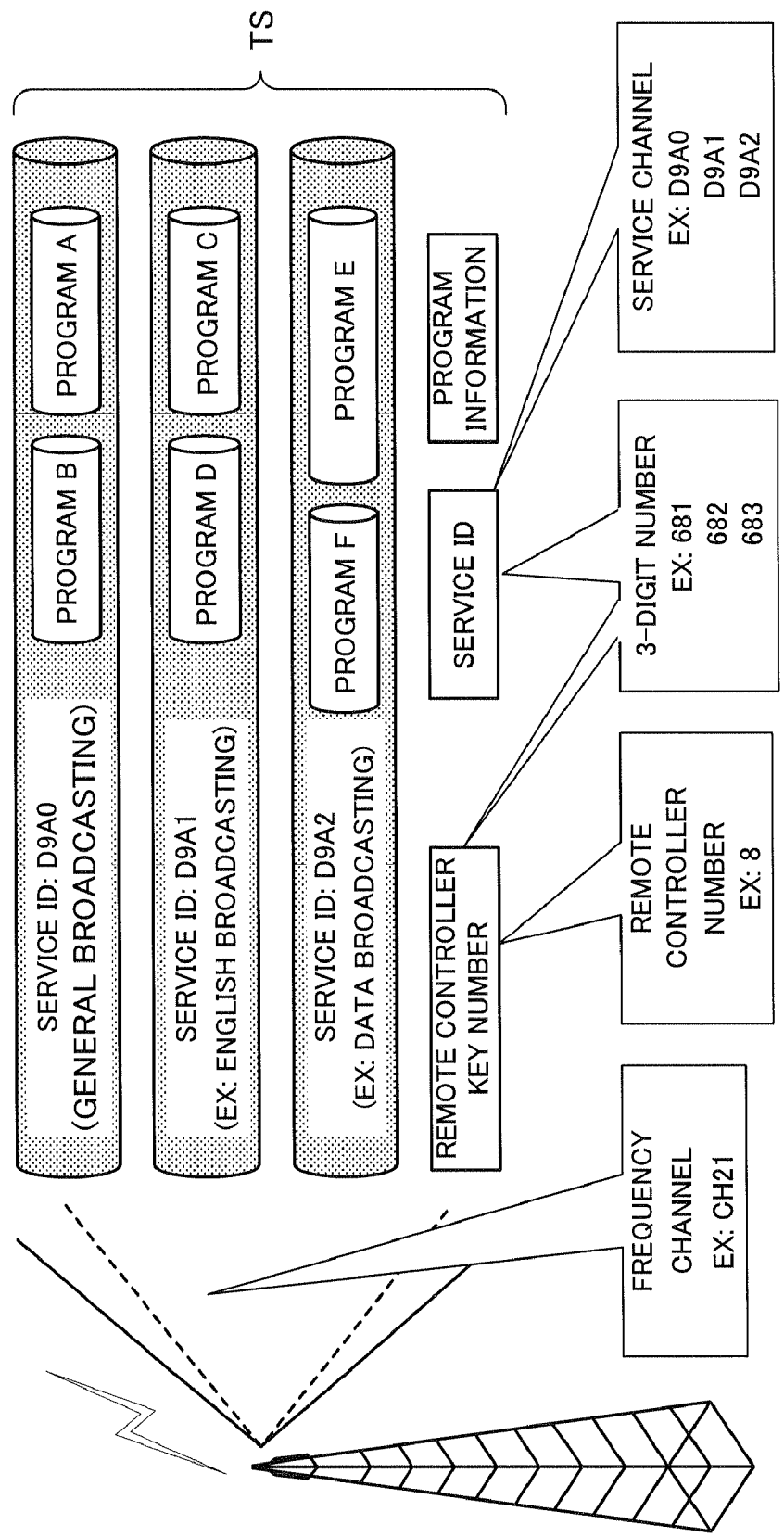
FIG. 1 shows channel definitions conceptually.
Figure 2:
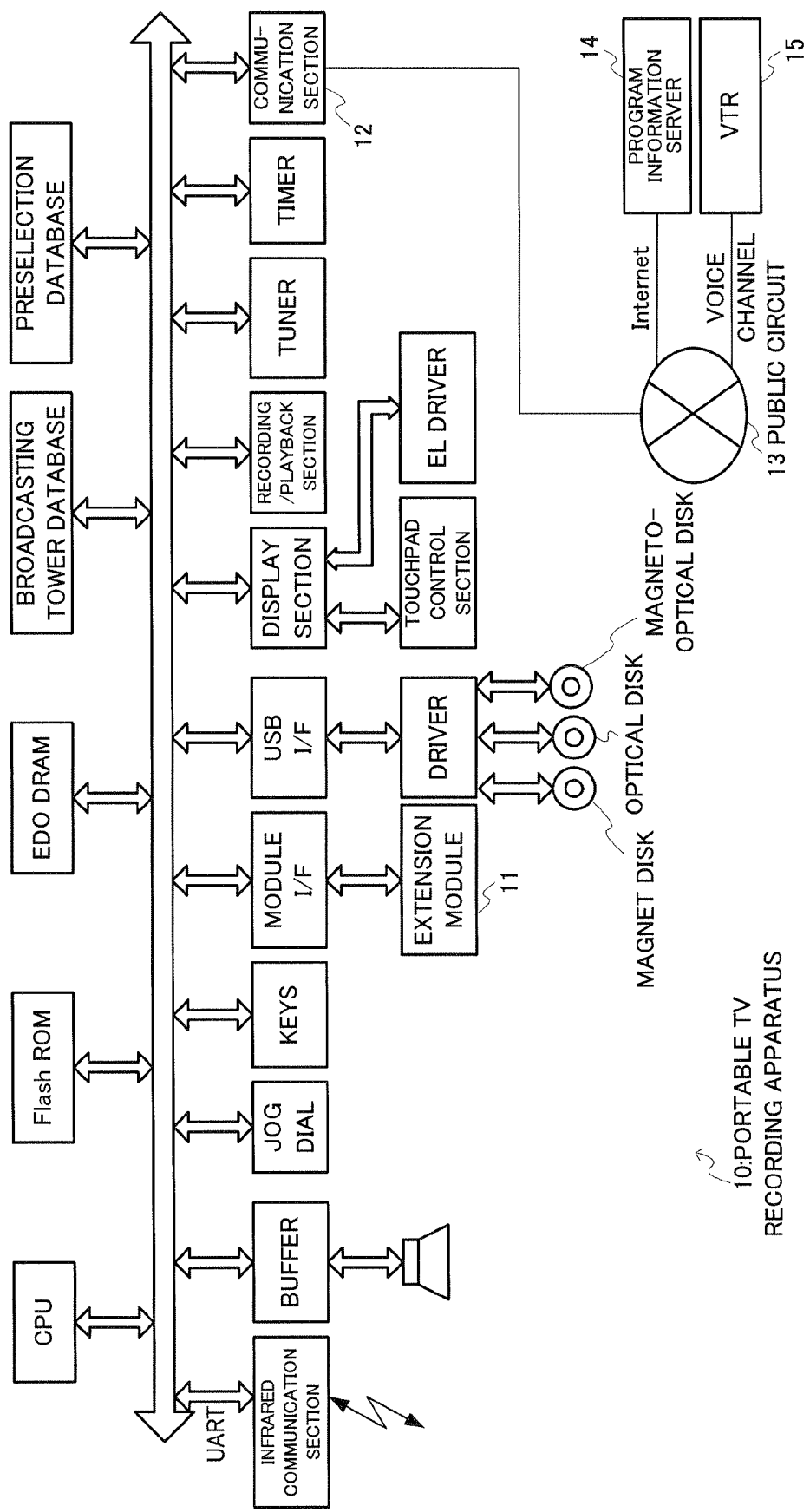
FIG. 2 is a block diagram showing the configuration of a portable TV recording apparatus described in Patent Document 1.
Figure 3:
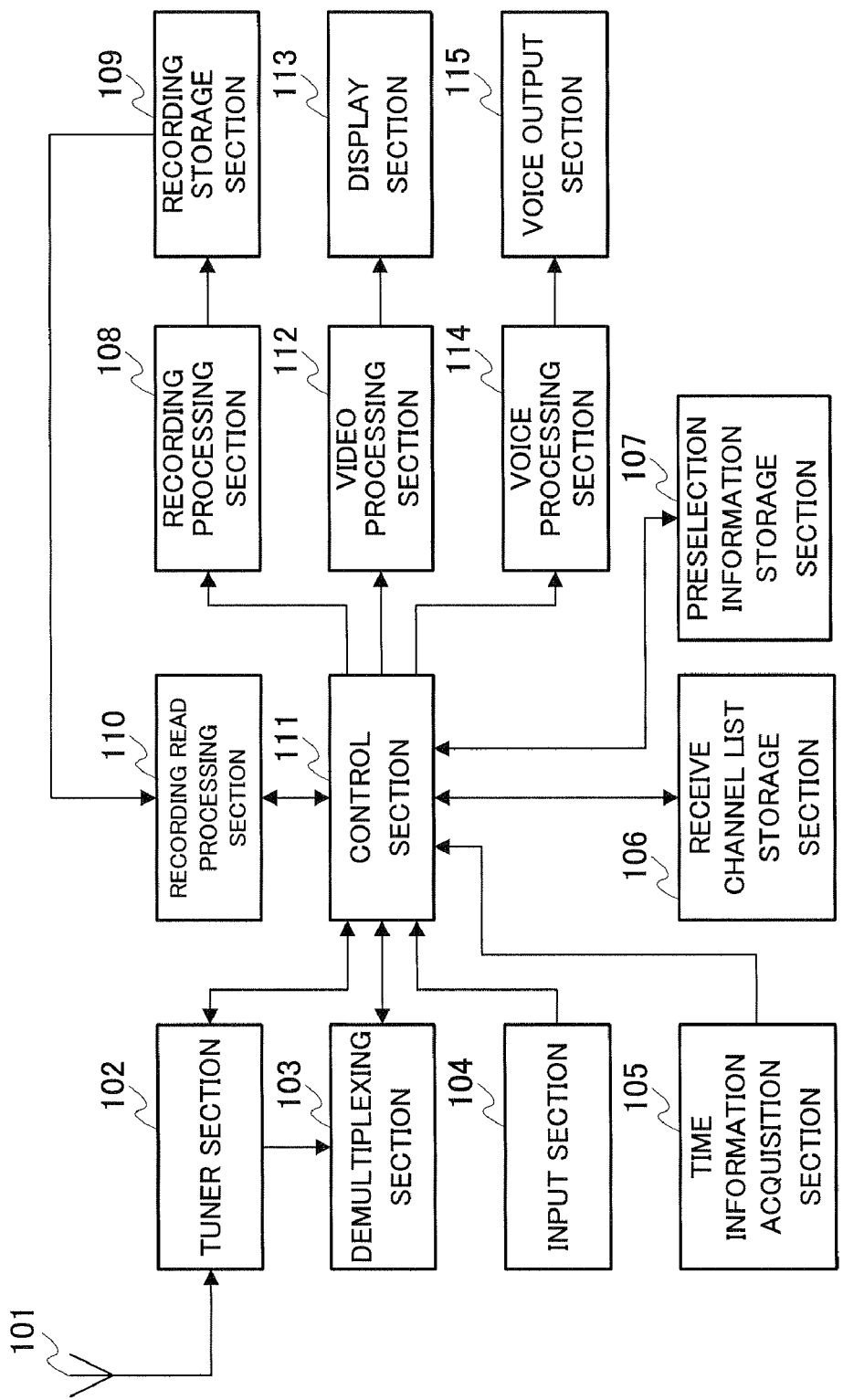
FIG. 3 is a block diagram showing the configuration of a portable TV recording apparatus according to Embodiment 1 of the present invention.

In a portable TV recording apparatus 100 according to Embodiment 1 of the present invention, as shown in FIG. 3, a tuner section 102 extracts a frequency signal of a channel specified by a user from a broadcast wave received via an antenna 101, and performs code demodulation processing of the extracted frequency signal. A signal that has undergone demodulation processing is output to a demultiplexing section 103 and a control section 111.

Demultiplexing section 103 separates the signal output from tuner section 112 into video, audio, and program information, and so forth, and outputs the separated information to control section 111.

An input section 104 comprises button keys, a camera, a microphone, and so forth, by means of which the user inputs preselection information such as channel and program information to control section 111. A time information acquisition section 105 determines the current time, and reports the determined current time to control section 111.

A receive channel list storage section 106 detects a receivable (viewable) broadcast wave, and by means of a channel search coordinated with remote controller numbers, records information on broadcasting stations that can be received at the location and time of the search as a receive channel list. Items included in a receive channel list include frequency channel, remote controller number, broadcasting station identifier, affiliate identifier (affiliation_id), service channel, program identifier, reception level, keyword, and so forth.

A preselection information storage section 107 stores input from input section 104 via control section 111. Preselection information includes such items as recording start time, recording end time, frequency channel, remote controller number, broadcasting station identifier, affiliate identifier, service channel, program identifier, keyword, and so forth, of which preselection information storage section 107 stores at least the recording start time and recording end time.

A recording processing section 108 writes video, audio, and program information, and so forth, output from demultiplexing section 103 via control section 111 to a recording storage section 109 comprising nonvolatile memory such as HDD, DVD, SD and so forth. A recording read processing section 110 reads recorded data from recording storage section 109 and outputs the read recorded data to control section 111.

Control section 111 performs TV playback, TV recording, recording playback, recording preselection, and so forth by controlling the various sections inside portable TV recording apparatus 100.

Video processing section 112 decodes a video stream coded by means of H.264 or the like, output from control section 111, and outputs the decoded signal to a display section 113. Display section 113 displays the image output from video processing section 112.

A voice processing section 114 decodes a voice stream coded by means of AAC or the like, output from control section 111, and outputs the decoded signal to a voice output section 115. Voice output section 115 outputs the voice output from voice processing section 114.

Figure 4:
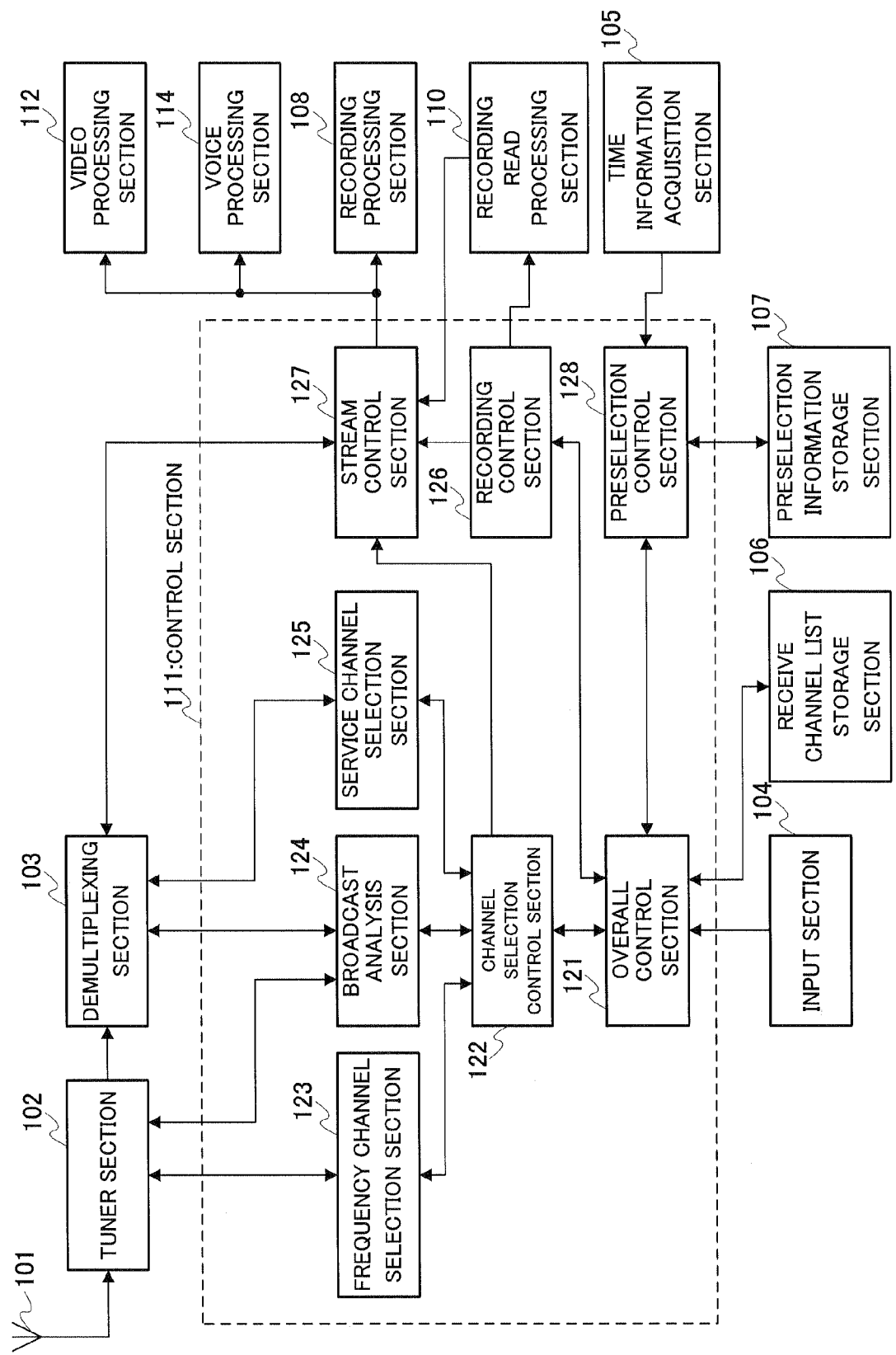
FIG. 4 is a block diagram showing the internal configuration of the control section shown in FIG. 3.

The internal configuration of control section 111 will now be described using FIG. 4. In this figure, an overall control section 121 performs integrated management of a channel selection control section 122, a recording control section 126, and a preselection control section 128. Specifically, overall control section 121 directs channel selection section 122 to perform channel selection for a channel in a receive channel list, and in the event of an abnormality such as an area becoming out of range, resulting in degraded reception of the broadcast wave being received, gives a directive to switch channel selection. Overall control section 121 also directs recording control section 126 to perform playback or recording, and furthermore writes preselection information input from input section 104 to preselection information storage section 107 via preselection control section 128, and confirms the presence of a broadcasting station by means of channel selection when preselection is performed and when recording starts. Overall control section 121 then performs a channel search according to the confirmation result, and writes a channel not included in the receive channel list to receive channel list storage section 106.

Channel selection control section 122 receives a directive from overall control section 121 and performs channel selection for the specified channel. Here, a channel selection operation is performed in three stages: directing a frequency channel selection section 123 to perform frequency channel selection, directing a broadcast analysis section 124 to perform broadcast wave analysis, and directing a service channel selection section 125 to perform service channel selection. If there is a video, audio, or suchlike playback directive, a playback request is made to a stream control section 127.

Frequency channel selection section 123 receives a directive from channel selection control section 122 and sets a frequency channel in tuner section 102, and if there is a receivable broadcast wave (TS) in the set frequency channel, determines frequency channel selection to have succeeded, and outputs the TS directly from tuner section 102 to demultiplexing section 103. If there is no receivable broadcast wave (TS), frequency channel selection is determined to have failed, and this fact is reported to channel selection control section 122.

Broadcast analysis section 124 receives a directive from channel selection control section 122, and performs demultiplexing section 103 setting and analysis of data separated by demultiplexing section 103. The broadcasting station information, TS service configuration, and so forth, obtained through this analysis are reported to channel selection control section 122. Broadcast analysis section 124 also monitors the status of tuner section 102, and if portable TV recording apparatus 100 moves out of range, reports this fact to channel selection control section 122.

Service channel selection section 125 receives a directive from channel selection control section 122, sets demultiplexing section 103 so as to extract a video, audio, or suchlike stream of the specified service within the TS, and also sets demultiplexing section 103 so that a stream extracted by demultiplexing section 103 is output to stream control section 127.

On receiving a recording directive from overall control section 121, recording control section 126 makes a setting for stream control section 127 to which the stream was input so that the input stream is output to recording processing section 108. Also, on receiving a playback directive from overall control section 121, recording control section 126 issues a recorded data read directive to recording read processing section 110 and has the read recorded data output to stream control section 127, and also makes a setting for stream control section 127 to which the stream was input so that the recorded data output from recording read processing section 110 is output to video processing section 112 and voice processing section 114. Recording control section 126 also sets stream control section 127 so that data recorded in a TS is separated by demultiplexing section 103.

Stream control section 127 receives control from channel selection control section 122 and recording control section 126, and outputs a stream output from demultiplexing section 103 or recorded data output from recording read processing section 110 to recording processing section 108, video processing section 112, and voice processing section 114. Here, simultaneous processing of video and audio and so forth is performed. When a TS is output from recording read processing section 110, the acquired TS is first separated by demultiplexing section 103, and then the acquired streams are output to recording processing section 108, video processing section 112, and voice processing section 114.

Preselection control section 128 writes preselection information output from input section 104 via overall control section 121 to preselection information storage section 107. Preselection control section 128 also reports the start of preselected recording preparatory processing to overall control section 121 so that recording is started at the recording start time stored in preselection information storage section 107.

Figure 5:
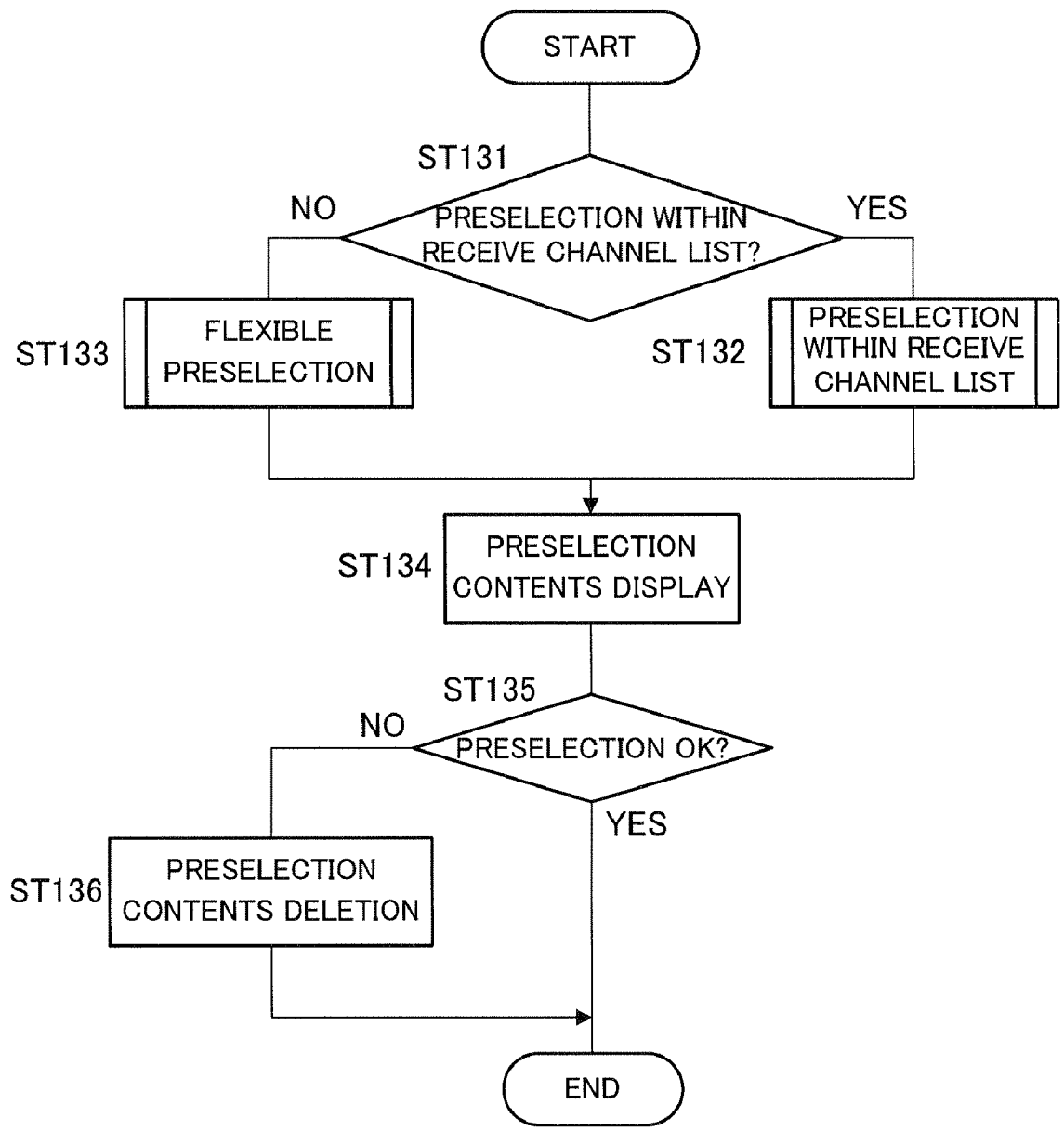
FIG. 5 is a flowchart showing preselection processing of the portable TV recording apparatus shown in FIG. 3.

Preselection processing of portable TV recording apparatus 100 with the above configuration will now be described using FIG. 5. Referring to FIG. 5, in step (hereinafter abbreviated to "ST") 131 the user is asked to determine whether or not preselection is to be performed using a receive channel list stored in receive channel list storage section 106 at the time of preselection (hereinafter referred to as "preselection within receive channel list"). If the user determines that "preselection within receive channel list" is to be performed (YES) the processing flow proceeds to ST132, and if the user determines that "preselection within receive channel list" is not to be performed (NO) the processing flow proceeds to ST133.

In ST132 "preselection within receive channel list" is performed. Details of the "preselection within receive channel list" procedure will be given later herein.

In ST133 preselection for a case where a receive channel list not stored in receive channel list storage section 106 at the time of preselection is necessary (hereinafter referred to as "flexible preselection") is performed. Details of the "flexible preselection" procedure will be given later herein.

In ST134 the preselection contents of "preselection within receive channel list" in ST132 or the preselection contents of "flexible preselection" in ST133 are displayed on display section 113.

In ST135 the user is asked to determine whether it is OK to perform preselection using the preselection contents displayed in ST134 (Preselection OK?). If the user determines that it is OK to perform preselection (YES), preselection using the displayed preselection contents is confirmed, and preselection processing is terminated. On the other hand, if the user determines that preselection is not to be performed (NO), the processing flow proceeds to ST136. In ST136 the preselection contents are deleted and preselection processing is terminated.

Figure 6:
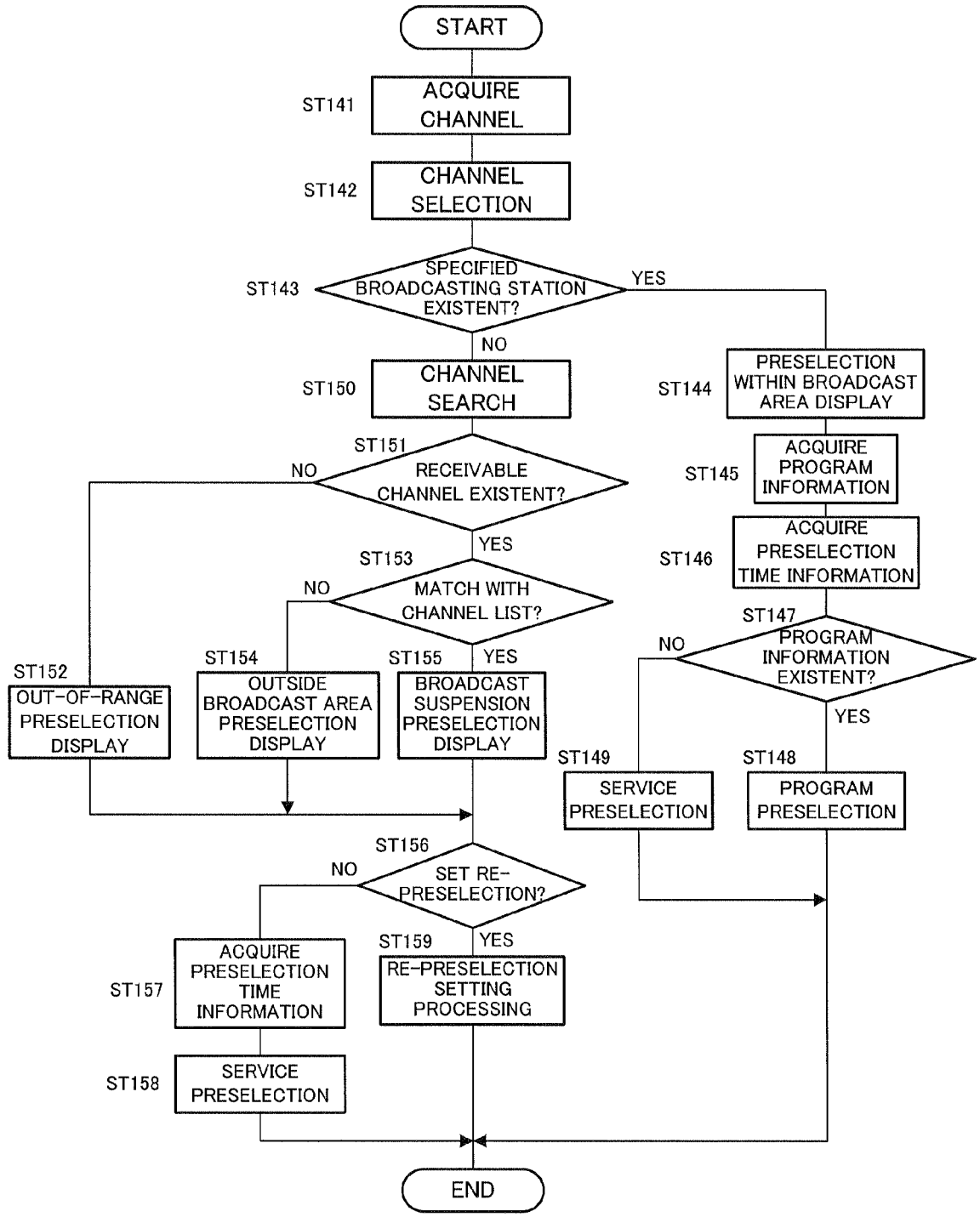
FIG. 6 is a flowchart showing the detailed procedure of "preselection within receive channel list" shown in FIG. 5.

The detailed procedure for "preselection within receive channel list" in ST132 in FIG. 5 will now be described using FIG. 6. In ST141 the user specifies a channel for which preselection is desired from input section 104 by means of a remote controller number or 3-digit number, and control section 111 acquires a frequency channel and service channel corresponding to the channel specified by the user from receive channel list storage section 106.

In ST142 frequency channel selection section 123 selects the frequency channel acquired in ST141, and in ST143, it is determined whether or not the specified broadcasting station exists. That is to say, if frequency channel selection in ST142 is successful, channel selection control section 122 determines that the specified broadcasting station exists (YES), and the processing flow proceeds to ST144. On the other hand, if channel selection fails, channel selection control section 122 determines that the specified broadcasting station does not exist (NO), and the processing flow proceeds to ST150.

In ST144 it is assumed that the current location is within a broadcast area and preselection within the broadcast area is to be performed, and the fact that the channel specified by the user in ST141 can be received is displayed on display section 113.

In ST145 channel selection is performed for the channel specified by the user, and acquisition of program information is performed from the broadcast wave. Terrestrial digital broadcasting specifications stipulate that an EIT (Event Information Table), which is an event information table within SI information, is to be received. The EIT contains program-related information such as program names, broadcast times, program contents, and so forth.

In ST146 the user is asked to input a recording start time and recording end time, and input of these times is received from the user. At this time, control section 111 may also display the program information acquired in ST145 on display section 113 at the same time as the request for recording start time and recording end time input, and time specification may be performed by means of EPG.

In ST147 it is determined whether or not it was possible for program information within the time input by the user in ST146 to be acquired from the broadcast wave. If it is determined that there is program information (YES) the processing flow proceeds to ST148, and if it is determined that there is no program information (NO) the processing flow proceeds to ST149.

In ST148 a program is specified and preselected, and "preselection within receive channel list" is terminated. In ST149 only the service channel is specified and preselected, and "preselection within receive channel list" is terminated.

In ST150, since it was determined in ST143 that the specified broadcasting station does not exist, channel selection control section 122 performs a channel search and detects channels that can be received at the current location, and overall control section 121 creates a new channel list.

In ST151 channel selection control section 122 determines whether or not there is a receivable channel based on the result of the channel search in ST150. If it is determined that there is no receivable channel—that is, that the user is out of range—(NO), the processing flow proceeds to ST152, and if it is determined that there is a receivable channel (YES), the processing flow proceeds to ST153.

In ST152, since recording cannot be performed at the present time because the user is out of range, display section 113 indicates that portable TV recording apparatus 100 is to be moved within range at the recording start time, and the processing flow proceeds to ST156.

In ST153 overall control section 121 determines whether or not the channel list newly created in ST150 is included in information already stored in receive channel list storage section 106. If even one new channel has been detected, this means that the current broadcast area is different from the broadcast area for which a channel list was previously created. Conversely, if the newly created channel list is entirely included in a previous channel list, it is determined that the channel specified by the user in ST141 is not currently broadcasting or has ceased broadcasting. If it is determined that the newly created channel list has not been stored (NO), the processing flow proceeds to ST154, and if it is determined that the newly created channel list has already been stored (YES), the processing flow proceeds to ST155.

In ST154, since the current broadcast area is different from the broadcast area for which a channel list was previously created, preselection outside a broadcast area is assumed, display section 113 indicates that there is a possibility that broadcast reception and recording cannot be performed, and the processing flow proceeds to ST156.

In ST155, since the channel specified by the user is not currently broadcasting or has ceased broadcasting, preselection during suspension of broadcasting is assumed, display section 113 indicates that there is a possibility that broadcast reception and recording cannot be performed, and the processing flow proceeds to ST156.

In ST156, since channel selection cannot be performed at the present time, display section 113 indicates that program information cannot be acquired, and that there is a possibility that recording will fail, and also asks the user to select whether preselection processing is to be performed again after a fixed time. If preselection processing is not to be performed again (NO), the processing flow proceeds to ST157, and if preselection processing is to be performed again (YES) the processing flow proceeds to ST159.

In ST157 the user is asked to input a recording start time and recording end time, and input of these times is received from the user. Here, although the user wants to preselect a channel within a current channel list, program information cannot be acquired because portable TV recording apparatus 100 is out of range or outside a broadcast area, or broadcasting of the desired channel is suspended.

In ST158 the service channel is specified and preselected, and "preselection within receive channel list" is terminated.

In ST159 a setting is made so that preselection processing is performed again when a broadcast wave can be acquired, or after a fixed time, and "preselection within receive channel list" is temporarily terminated.

Figure 7:
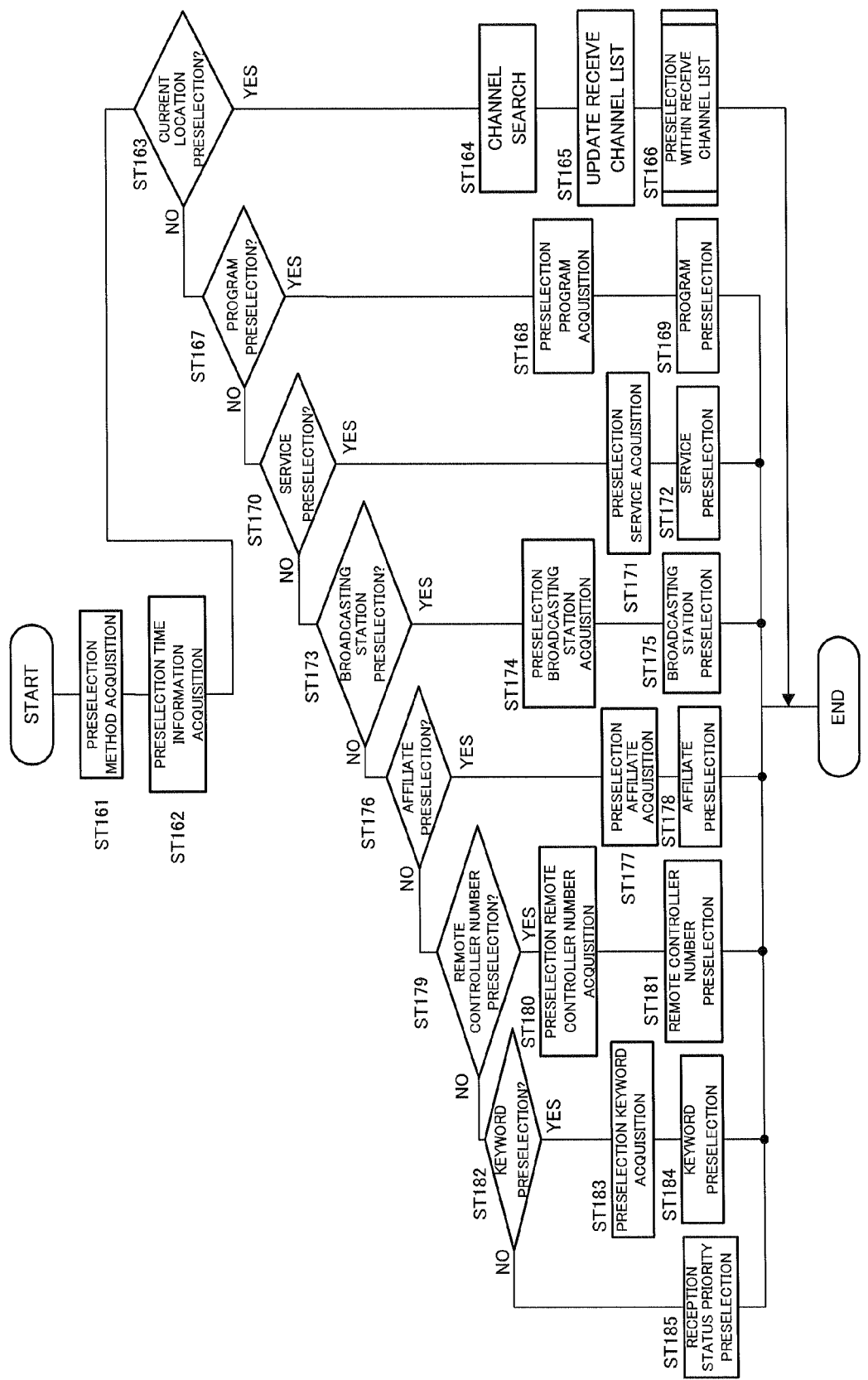
FIG. 7 is a flowchart showing the detailed procedure of "flexible preselection" shown in FIG. 5.

The detailed procedure for "flexible preselection" in ST133 in FIG. 5 will now be described using FIG. 7. In ST161 in FIG. 7, the user is asked to input which method is to be used for preselection from a plurality of preselection methods, and the specification of a preselection method is received from the user. Preselection methods include current location preselection, program preselection, service preselection, broadcasting station preselection, affiliate preselection, remote controller number preselection, keyword preselection, and reception level priority preselection. These preselection methods will be explained in turn below together with the "flexible preselection" procedure.

In ST162 the user is asked to input a recording start time and recording end time, and input of these times is received from the user.

In ST163 it is determined whether or not the preselection method specified by the user in ST161 is current location preselection. If the specified preselection method is determined to be current location preselection (YES) the processing flow proceeds to ST164, and if the specified preselection method is determined not to be current location preselection (NO) the processing flow proceeds to ST167. Here, current location preselection means preselection from a channel list for which channel selection is possible at the present time.

In ST164 a channel search is performed, and in ST165 updating to the latest channel list is performed in accordance with the channel search. Then, in ST166, above-described "preselection within receive channel list" is performed, and "flexible preselection" is terminated.

In ST167 it is determined whether or not the preselection method specified by the user in ST161 is program preselection. If the specified preselection method is determined to be program preselection (YES) the processing flow proceeds to ST168, and if the specified preselection method is determined not to be program preselection (NO) the processing flow proceeds to ST170. Program preselection means that the user performs preselection by specifying a program.

In ST168 the user is asked to input a program to be preselected, and input of a program to be preselected is received from the user. In ST169 the input program is specified and preselected, and "flexible preselection" is terminated.

In ST170 it is determined whether or not the preselection method specified by the user in ST161 is service preselection. If the specified preselection method is determined to be service preselection (YES) the processing flow proceeds to ST171, and if the specified preselection method is determined not to be service preselection (NO) the processing flow proceeds to ST173. Service preselection means that the user performs preselection by specifying a service.

In ST171 the user is asked to input a service to be preselected, and input of a service to be preselected is received from the user. In this case, if the terminal holds a service list of nationwide broadcasting stations, a service is input based on that information. A service list may be acquired from the Internet or another device. If there is no service list of nationwide broadcasting stations a service is specified from an existing receive channel list. Then, in ST172, the input service is specified and preselected, and "flexible preselection" is terminated.

In ST173 it is determined whether or not the preselection method specified by the user in ST161 is broadcasting station preselection. If the specified preselection method is determined to be broadcasting station preselection (YES) the processing flow proceeds to ST174, and if the specified preselection method is determined not to be broadcasting station preselection (NO) the processing flow proceeds to ST176. Broadcasting station preselection means that a broadcasting station to be preselected is specified, and preselection is performed with that broadcasting station's primary service or TS. Whether the primary service or TS is to be preselected is decided during initialization, or is specified by the user at the time of broadcasting station preselection input. Here, an explanation will be given assuming a case where primary service is specified.

In ST174 the user is asked to input a broadcasting station to be preselected, and input of a broadcasting station to be preselected is received from the user. In this case, if the terminal holds a list of nationwide broadcasting stations, a broadcasting station is input based on that information. A broadcasting station list may be acquired from the Internet or another device. If there is no nationwide broadcasting station list a broadcasting station is input from an existing receive channel list. Then, in ST175, the input broadcasting station is specified and preselected, and "flexible preselection" is terminated.

In ST176 it is determined whether or not the preselection method specified by the user in ST161 is affiliate preselection. If the specified preselection method is determined to be affiliate preselection (YES) the processing flow proceeds to ST177, and if the specified preselection method is determined not to be affiliate preselection (NO) the processing flow proceeds to ST179. Affiliates will be briefly explained here. Broadcasting stations comprise key stations and local stations, and when a local station belongs to a key station, it is called an affiliate. A key station is assigned an identifier called "affiliation_id" to distinguish it from other key stations, and an affiliate includes the affiliation_id of the key station to which it belongs in a broadcast wave that it sends. There are also local stations that belong to a plurality of key stations, and such local stations send a plurality of affiliation_ids in order of priority. There are also local stations that do not belong to any key station.

Affiliate preselection means that an affiliate to be preselected is specified, and preselection is performed with that affiliate's primary service or TS. With this preselection method, portable TV recording apparatus 100 can, for example, record programs broadcast by TBS from 15:00 to 20:00 whether located in Tokyo or in Osaka. If the specified affiliate does not exist at the start of recording, a broadcast from another broadcasting station is recorded. Also, since an affiliate and a key station do not necessarily broadcast the same program at the same time, a user may not be able to record a desired broadcast.

In ST177 the user is asked to input an affiliate to be preselected, and input of an affiliate to be preselected is received from the user. Then, in ST178, the input affiliate is specified and preselected, and "flexible preselection" is terminated.

In ST179 it is determined whether or not the preselection method specified by the user in ST161 is remote controller number preselection. If the specified preselection method is determined to be remote controller number preselection (YES) the processing flow proceeds to ST180, and if the specified preselection method is determined not to be remote controller number preselection (NO) the processing flow proceeds to ST182. Remote controller number preselection means that a remote controller number or 3-digit number to be preselected is specified, and when a remote controller number is specified the primary service is preselected, whereas when a 3-digit number is specified, if the corresponding broadcasting station exists but the specified service does not, the primary service or TS is preselected. Since remote controller numbers and service numbers do not change in the case of movement within an MFN (Multi Frequency Network), in which the same broadcasting is performed and only the frequency channel differs, remote controller number preselection is useful for a user who often moves within an MFN. Also, since the same remote controller number is often used by an affiliate, the possibility of executing preselection for a desired program at one's destination can be improved.

In ST180 the user is asked to input a remote controller number to be preselected, and input of a remote controller number to be preselected is received from the user. Then, in ST181, the input remote controller number is specified and preselected, and "flexible preselection" is terminated.

In ST182 it is determined whether or not the preselection method specified by the user in ST161 is keyword preselection. If the specified preselection method is determined to be keyword preselection (YES) the processing flow proceeds to ST183, and if the specified preselection method is determined not to be keyword preselection (NO) the processing flow proceeds to ST185. Keyword preselection means that a program name, genre, or suchlike keyword is specified, and a broadcast that includes the specified keyword is preselected. A keyword may be any information that is included in EIT information, other PSI/SI information, or the like.

In ST183 the user is asked to input a keyword, and keyword input is received from the user. If a plurality of keywords are input at this time, input of their priority order is also received. By this means, if a program searched for with a low-priority keyword and a program searched for with a high-priority keyword are different, the program searched for with the high-priority keyword is preselected. Then, in ST184, a program that matches an input keyword is specified and preselected, and "flexible preselection" is terminated.

In ST185 the primary service or TS of the broadcasting station with the highest reception level at the start of recording is specified and preselected, and "flexible preselection" is terminated. Reception status priority preselection means that the channel with the best reception status is preselected. Reception status is described here as reception level, but is not limited to this, and may also be electric field strength, bit error rate, packet error rate, or the like.

Recording with contents preselected in this way requires preparations prior to the start of recording. These preparations are handled as preselection preparatory processing, the procedure of which will be described using FIG. 8. In ST191 in FIG. 8, portable TV recording apparatus 100 is started up a fixed period of time before the start of preselected recording. This fixed period of time should be longer than the time necessary for a channel search.

In ST192 preparations are performed in accordance with the preselection method. The preselection preparatory processing of each preselection method will be described later herein. In ST193, since a frequency channel and service channel are stored in preselection information storage section 107 as preselection information at the time of preselection processing, channel selection is performed using these channels, non-channel-information PSI/SI information is acquired, and the preselection information table is complemented.

In ST194 it is determined whether or not the recording start time and recording end time stored in preselection information storage section 107 as preselection information at the time of preselection processing are to be changed to the program start time and end time included in the PSI/SI information acquired in ST193. Whether or not a change is to be made is set beforehand as an initial setting, and the initial setting may be confirmed, or may be reported to the user and determination of whether or not a change is to be made requested. If it is determined that the time information is to be amended (YES) the processing flow proceeds to ST195, and if it is determined that the time information is not to be amended (NO) the processing flow proceeds to ST196.

In ST195 the recording start time and recording end time stored in preselection information storage section 107 are changed to the program start time and end time included in the PSI/SI information acquired in ST193.

In ST196, if there is a program corresponding to the preselection information specified in the preselection processing, this is reported to the user. Also, if a broadcast is out of range, this is also reported to the user. The reporting method may be text display, voice, vibration, or the like.

In ST197 the user is asked to confirm whether or not the preselection contents at the present time are OK (Preselection contents OK?). In the case of input indicating that the reported preselection contents are OK (YES) preselection preparatory processing is terminated, and in the case of input indicating that the reported preselection contents are not OK (NO) the processing flow proceeds to ST198. If there is no input from the user within a fixed period of time, the reported preselection contents are assumed to be OK, and preselection preparatory processing is terminated.

In ST198 the user is asked to specify whether or not preselection preparatory processing is to be executed again after a fixed period of time. Similarly, if the user has come within broadcast range due to intermittent reception or if the broadcast area is changed, the user is asked to specify whether or not preselection preparatory processing is to be executed again. In the case of input indicating that preselection preparatory processing is not to be executed again (NO) the processing flow proceeds to ST199, and in the case of input indicating that preselection preparatory processing is to be executed again (YES) the processing flow proceeds to ST200.

In ST199 preselection contents are amended or deleted by the user, and preselection preparatory processing is terminated. In ST200 preselection preparatory processing is executed again, and preselection preparatory processing is temporarily terminated.

Figure 8:
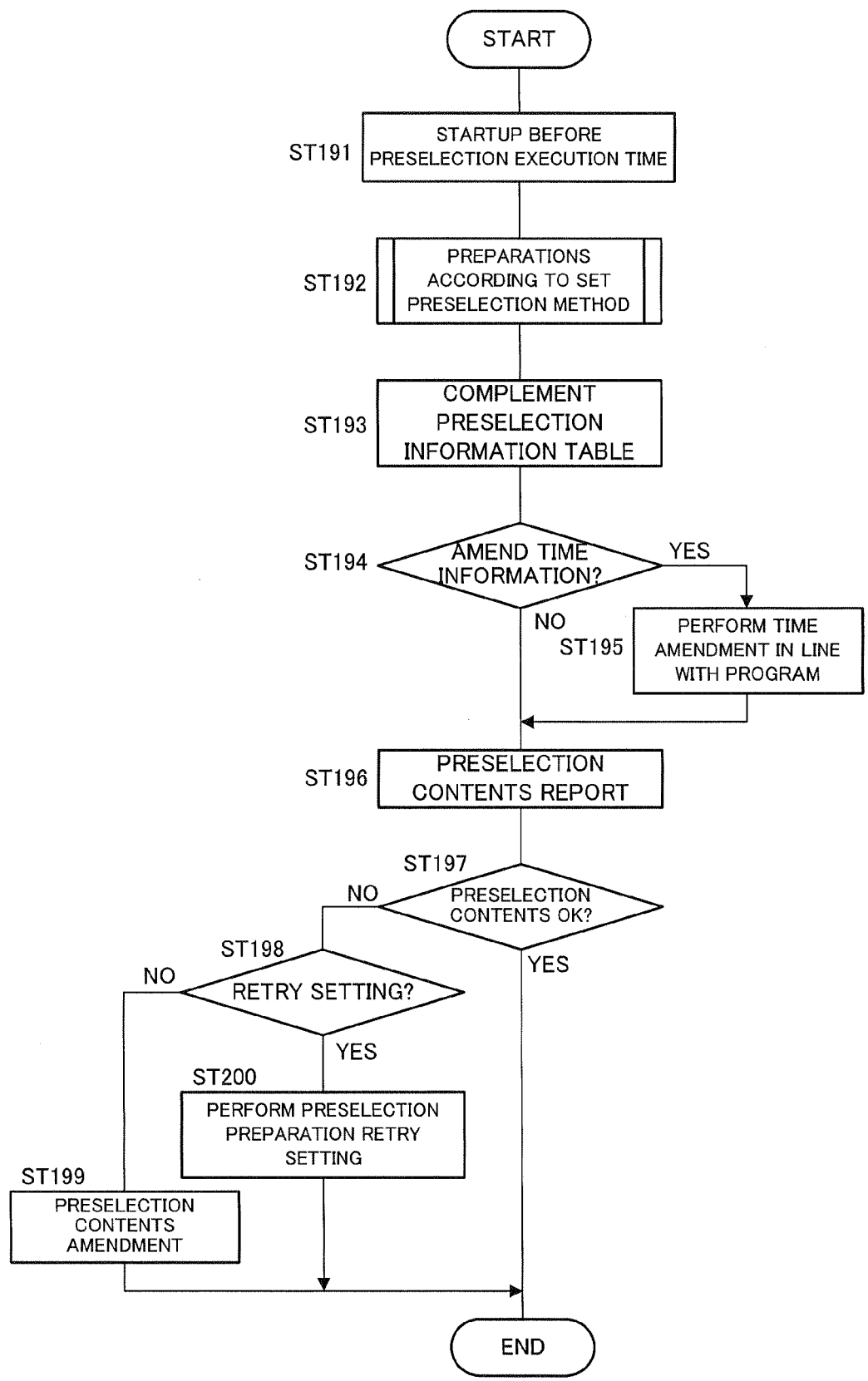
FIG. 8 is a flowchart showing the procedure of preselection preparatory processing.
Figure 9:
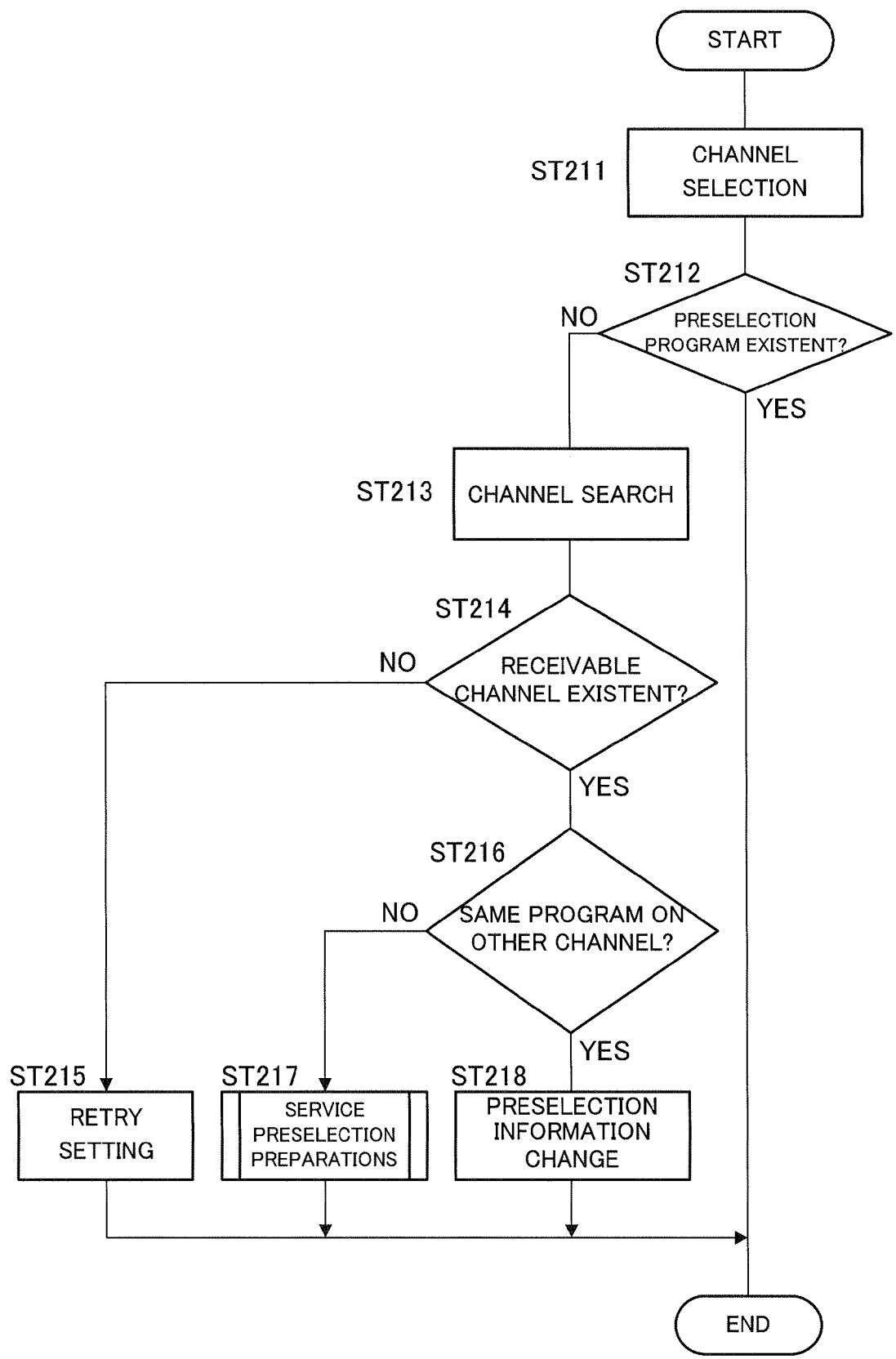
FIG. 9 is a flowchart showing the procedure of program preselection preparatory processing.

Next, preselection preparatory processing according to each of the preselection methods in ST192 in FIG. 8 will be described using relevant drawings. FIG. 9 is a flowchart showing the procedure of program preselection preparatory processing. In ST211 in this figure, channel selection is performed using the service channel stored in preselection information storage section 107 as preselection information, and program information of the selected channel is acquired. In ST212, whether the specified program is started at the specified time is determined based on the acquired program information. If the program is determined to be started (YES) program preselection preparations are terminated, and if the program is determined not to be started (NO) the processing flow proceeds to ST213.

In ST213 a channel search is performed, and if a receivable channel is detected, PSI/SI information of that channel is acquired. It is immaterial whether all PSI/SI information is acquired, or partial PSI/SI information is acquired.

In ST214 channel selection control section 122 determines whether or not there is a receivable channel based on the result of the channel search in ST213. If it is determined that there is no receivable channel—that is, the user is out of range— (NO) the processing flow proceeds to ST215, and if it is determined that there is a receivable channel (YES) the processing flow proceeds to ST216.

In ST215, a setting is made to perform program preselection preparatory processing again after a fixed period of time, or when a broadcast wave can be received due to intermittent reception, and program preselection preparatory processing is terminated.

In ST216 it is determined whether or not the specified program is on a channel other than the specified channel within a fixed period of time from the specified time, based on the PSI/SI information acquired in ST213. If it is determined that the specified program is not on another channel (NO) the processing flow proceeds to ST217, and if it is determined that the specified program is on another channel (YES) the processing flow proceeds to ST218. Here, a fixed period of time from the specified time may be, for example, 24 hours from the recording start time or recording end time.

In ST217 service preselection preparations described later herein are performed, and program preselection preparatory processing is terminated. In ST218, on the other hand, preselection contents are changed to a program of a channel other than the specified channel, and program preselection preparatory processing is terminated.

Figure 10:
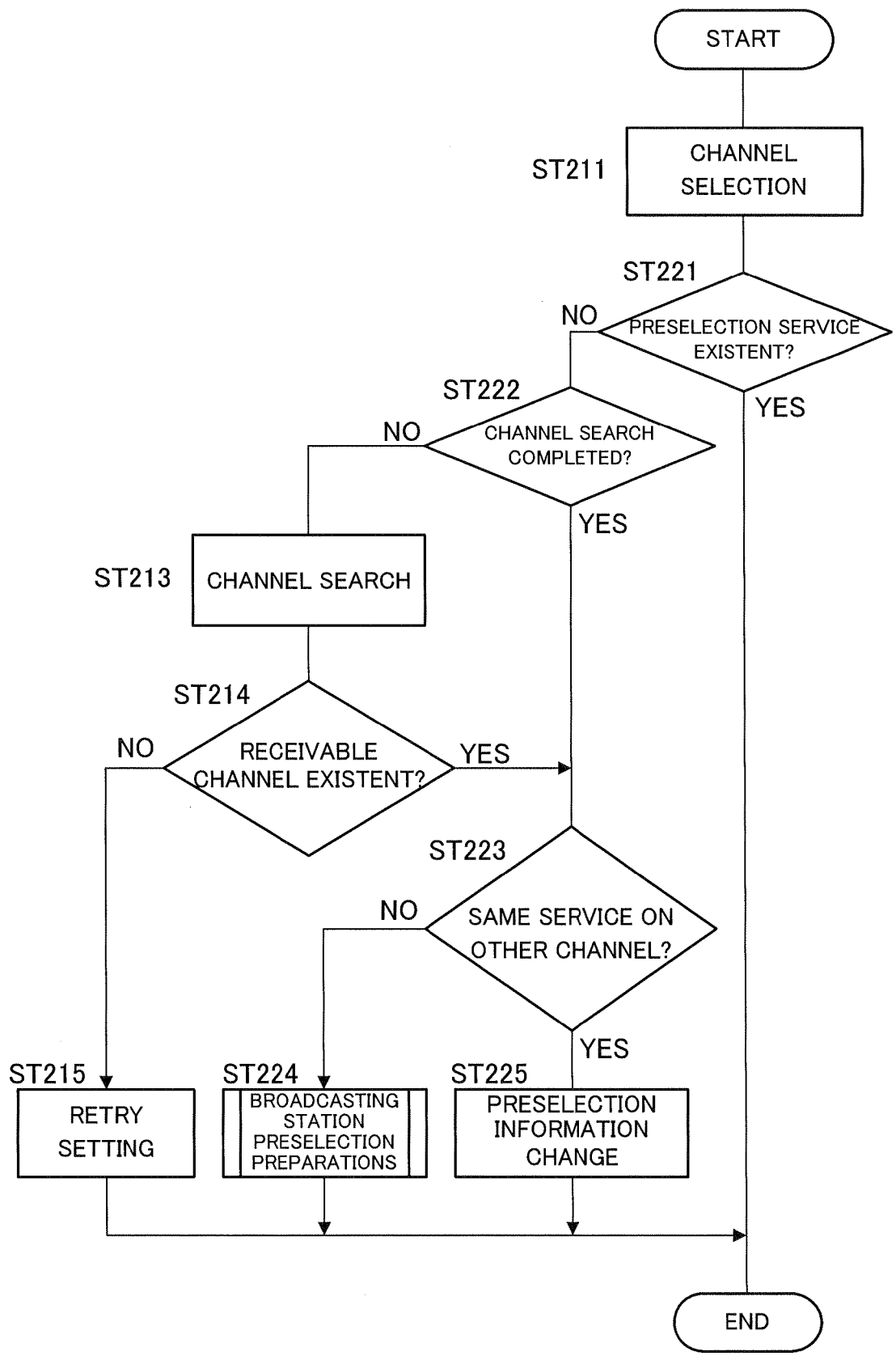
FIG. 10 is a flowchart showing the procedure of service preselection preparatory processing.

Next, service preselection preparatory processing will be described using FIG. 10. Parts in FIG. 10 common to FIG. 9 are assigned the same numerals as in FIG. 9, and duplicate descriptions are omitted. In ST221 in FIG. 10, it is determined whether or not the specified service is present on the service channel selected in ST211. If it is determined that the specified service is present (YES) service preselection preparatory processing is terminated, and if it is determined that the specified service is not present (NO) the processing flow proceeds to ST222.

In ST222 it is determined whether or not a channel search has already been performed. If it is determined that a channel search has already been performed (YES) the processing flow proceeds to ST223, and if it is determined that a channel search has not already been performed (NO) the processing flow proceeds to ST213.

In ST223 it is determined whether or not the specified service is on a channel other than the specified channel within a fixed period of time from the specified time, based on the PSI/SI information acquired in ST213. If it is determined that the specified service is on another channel (YES) the processing flow proceeds to ST225, and if it is determined that the specified service is not on another channel (NO) the processing flow proceeds to ST224.

In ST224 broadcasting station preselection preparations described later herein are performed, and service preselection preparatory processing is terminated. In ST225, on the other hand, preselection contents are changed to a service of a channel other than the specified channel, and service preselection preparatory processing is terminated.

Figure 11:
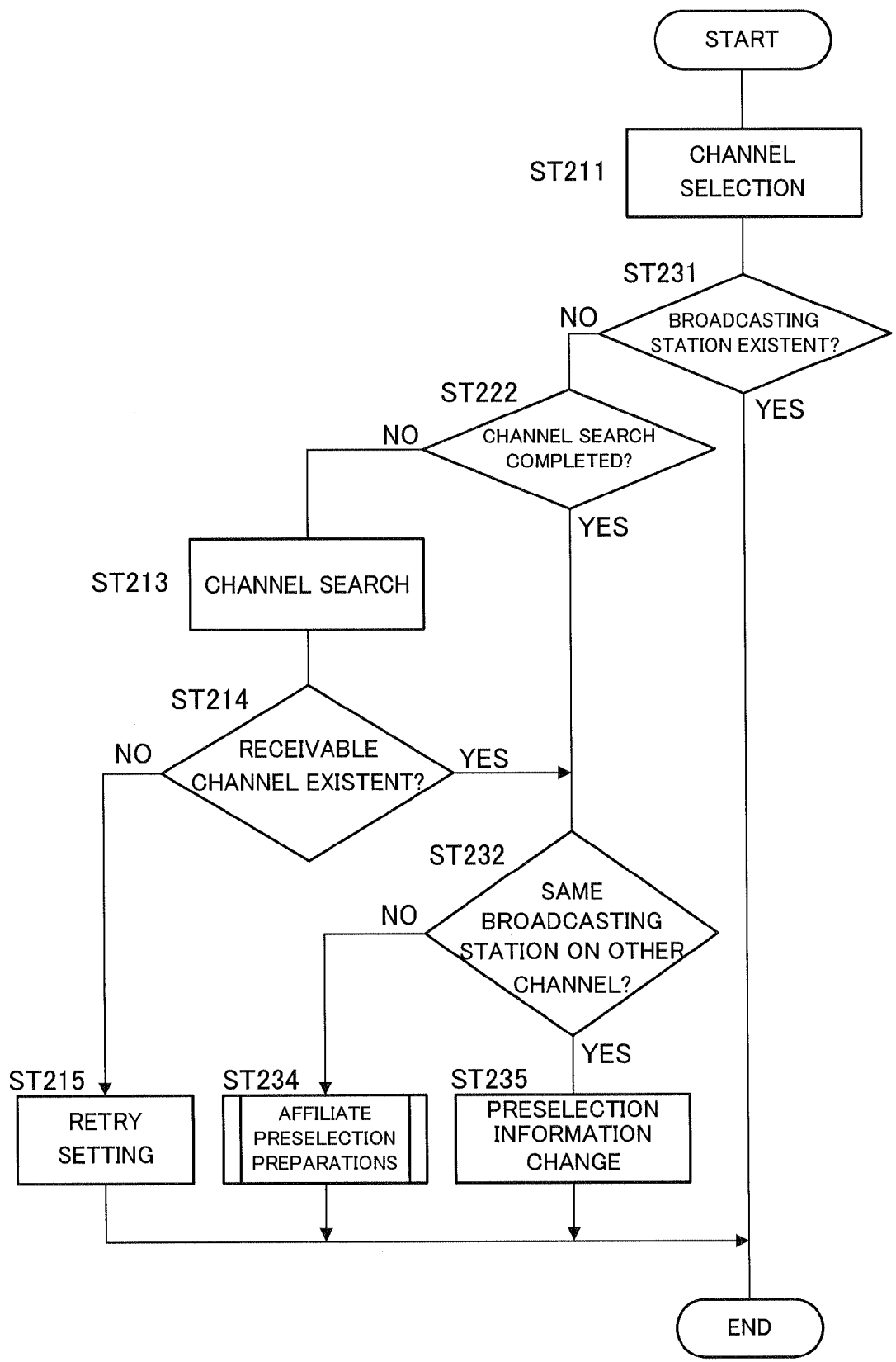
FIG. 11 is a flowchart showing the procedure of broadcasting station preselection preparatory processing.

Next, broadcasting station preselection preparatory processing will be described using FIG. 11. Parts in FIG. 11 common to FIG. 10 are assigned the same numerals as in FIG. 10, and duplicate descriptions are omitted. In ST231 in FIG. 11, it is determined whether or not the specified broadcasting station is present on the frequency channel selected in ST211. In broadcasting station preselection, only frequency channel selection is performed, since a service channel has not been specified at the time of preselection. If it is determined that the specified broadcasting station is present (YES) broadcasting station preselection preparatory processing is terminated, and if it is determined that the specified broadcasting station is not present (NO) the processing flow proceeds to ST222.

In ST232 it is determined whether or not the specified program is on a broadcasting station other than the specified broadcasting station within a fixed period of time from the specified time, based on acquired PSI/SI information. If it is determined that the specified program is on another broadcasting station (YES) the processing flow proceeds to ST235, and if it is determined that the specified program is not on another broadcasting station (NO) the processing flow proceeds to ST234.

In ST234 affiliate preselection preparations described later herein are performed, and broadcasting station preselection preparatory processing is terminated. In ST235, on the other hand, preselection contents are changed so that recording is performed using the primary service or TS of a broadcasting station other than the specified broadcasting station, and broadcasting station preselection preparatory processing is terminated.

Figure 12:
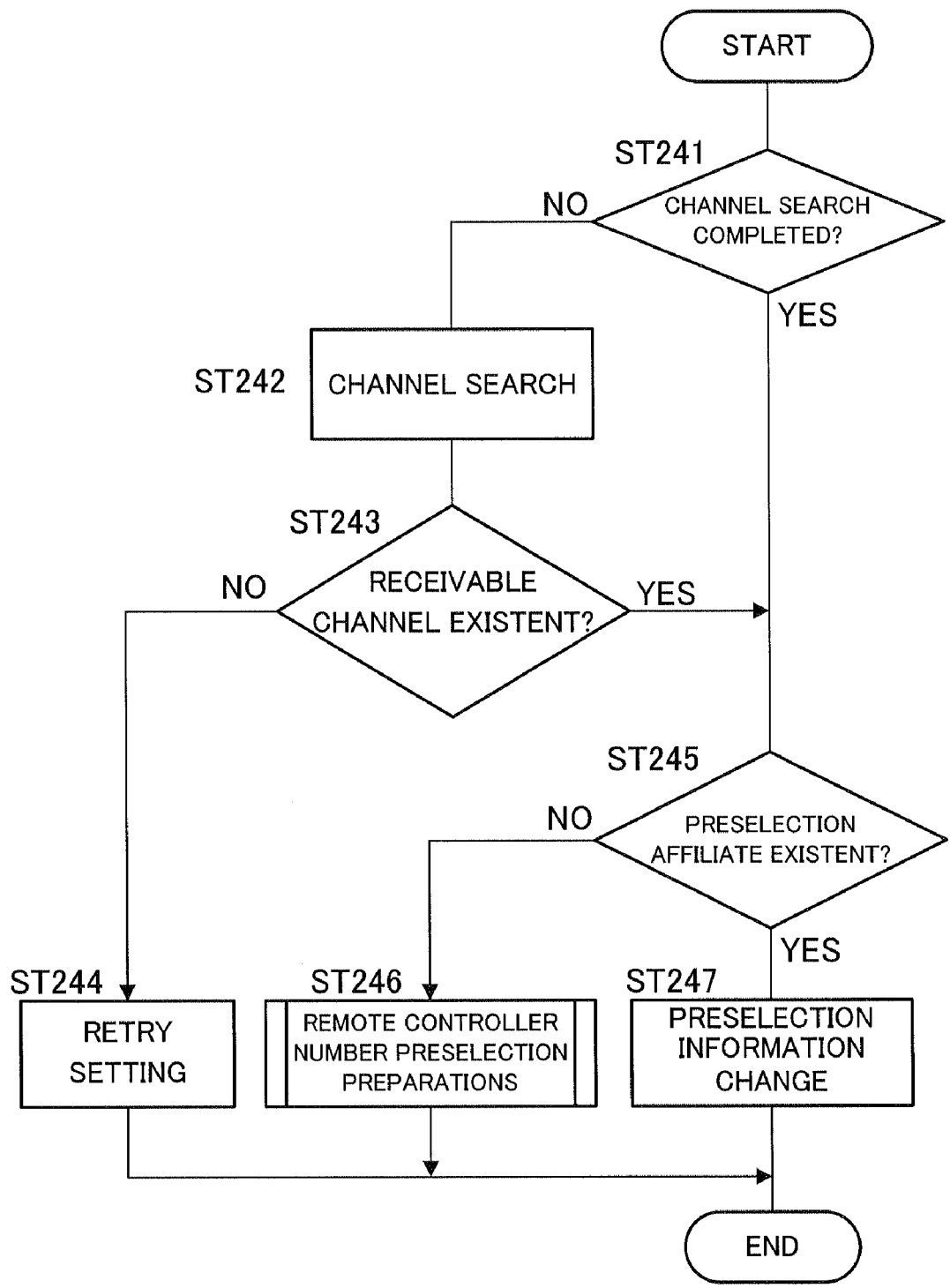
FIG. 12 is a flowchart showing the procedure of affiliate preselection preparatory processing.

Next, affiliate preselection preparatory processing will be described using FIG. 12. In ST241 in FIG. 12, it is determined whether or not a channel search has already been performed. If it is determined that a channel search has already been performed (YES) the processing flow proceeds to ST245, and if it is determined that a channel search has not already been performed (NO) the processing flow proceeds to ST242.

In ST242 a channel search is performed, and if a receivable channel is detected, PSI/SI information of that channel is acquired and the processing flow proceeds to ST243. It is immaterial whether all PSI/SI information is acquired, or partial PSI/SI information is acquired.

In ST243 channel selection control section 122 determines whether or not there is a receivable channel based on the result of the channel search in ST242. If it is determined that there is a receivable channel (YES) the processing flow proceeds to ST245, and if it is determined that there is no receivable channel—that is, the user is out of range—(NO) the processing flow proceeds to ST244.

In ST244, a setting is made to perform affiliate preselection preparatory processing again after a fixed period of time, or when a broadcast wave can be received due to intermittent reception, and affiliate preselection preparatory processing is temporarily terminated.

In ST245 it is determined whether or not there is a preselection affiliate. If it is determined that there is a preselection affiliate (YES) the processing flow proceeds to ST247, and if it is determined that there is no preselection affiliate (NO) the processing flow proceeds to ST246.

In ST246 remote controller number preselection preparations described later herein are performed, and affiliate preselection preparatory processing is terminated. In ST247, on the other hand, the frequency channel and service channel of the specified affiliate are set as preselection information, and affiliate preselection preparatory processing is terminated. However, if TS recording has been set beforehand, only the frequency channel is set. An affiliate may be an affiliate of a plurality of key stations, and there may also be multiple detections of a specified affiliate due to the relationship between broadcast areas. In such cases, the channel with the highest affiliate information priority is set. If priorities are the same, the channel with the highest reception level is set.

Figure 13:
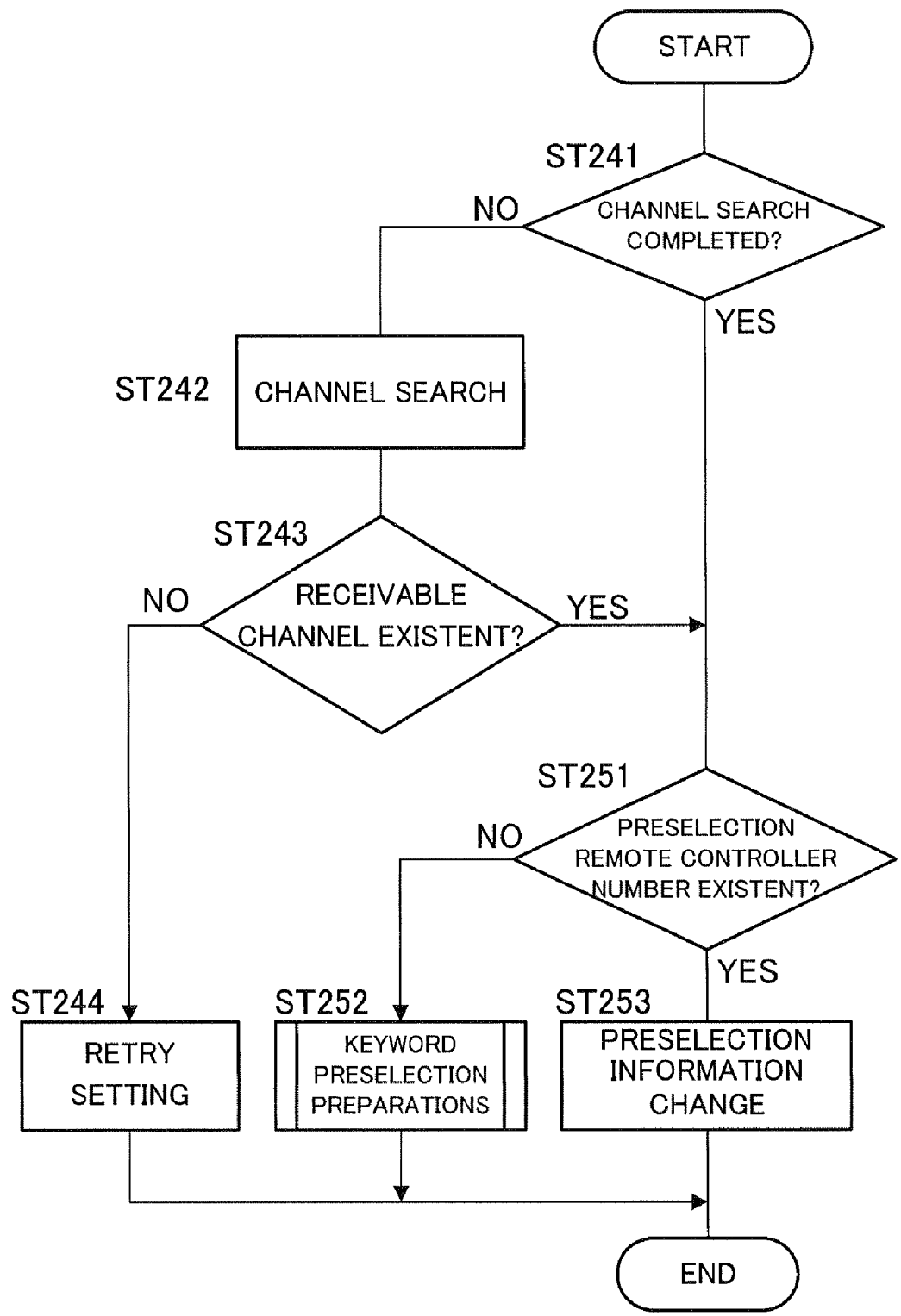
FIG. 13 is a flowchart showing the procedure of remote controller number preselection preparatory processing.

Next, remote controller number preselection preparatory processing will be described using FIG. 13. Parts in FIG. 13 common to FIG. 12 are assigned the same numerals as in FIG. 12, and duplicate descriptions are omitted. In ST251 in FIG. 13, it is determined whether or not a remote controller number or 3-digit number specified at the time of preselection processing is included in the PSI/SI information of a receivable channel. If it is determined that the remote controller number or 3-digit number is included (YES) the processing flow proceeds to ST253, and if it is determined that the remote controller number or 3-digit number is not included (NO) the processing flow proceeds to ST252.

In ST252 keyword preselection preparations described later herein are performed, and remote controller number preselection preparatory processing is terminated. In ST253, on the other hand, the channel of the remote controller number or 3-digit number determined to be included in the PSI/SI information in ST251 is set in preselection information. If a plurality of corresponding channels exist, the channel with the highest reception level is set.

Figure 14:
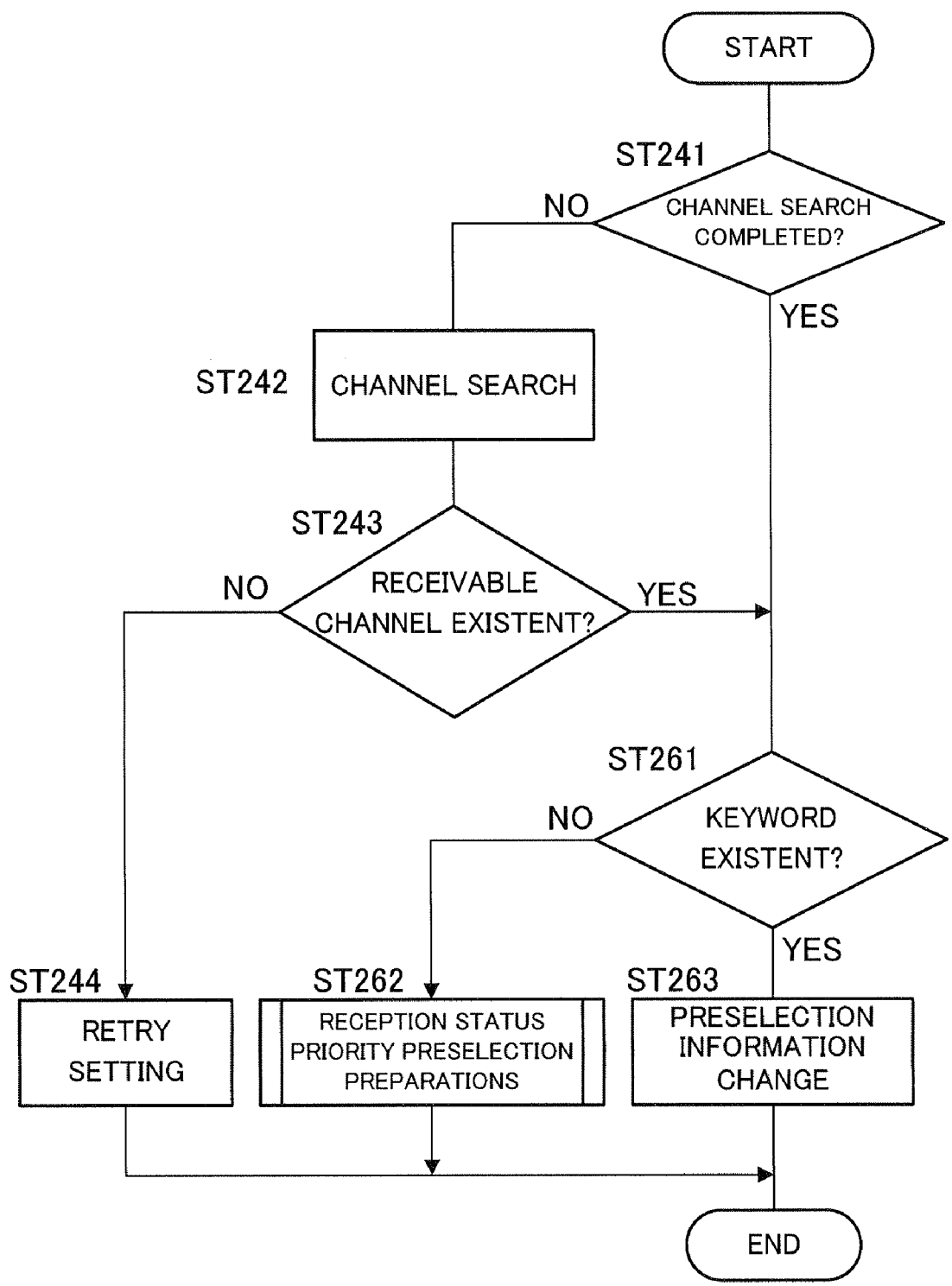
FIG. 14 is a flowchart showing the procedure of keyword preselection preparatory processing.

Next, keyword preselection preparatory processing will be described using FIG. 14. Parts in FIG. 14 common to FIG. 12 are assigned the same numerals as in FIG. 12, and duplicate descriptions are omitted. In ST261 in FIG. 14, it is determined whether or not a keyword specified at the time of preselection processing is included in the PSI/SI information of a receivable channel. If it is determined that a keyword is included (YES) the processing flow proceeds to ST263, and if it is determined that a keyword is not included (NO) the processing flow proceeds to ST262.

In ST262 reception status priority preselection preparations described later herein are performed, and keyword preselection preparatory processing is terminated. In ST263, on the other hand, a program for which a keyword was determined to be included in the PSI/SI information in ST261 is set in preselection information. If a plurality of corresponding programs exist, the program that includes the highest-priority keyword is set. If all keywords match, the program closest to the broadcast time or the program with the highest reception level is preselected.

Figure 15:
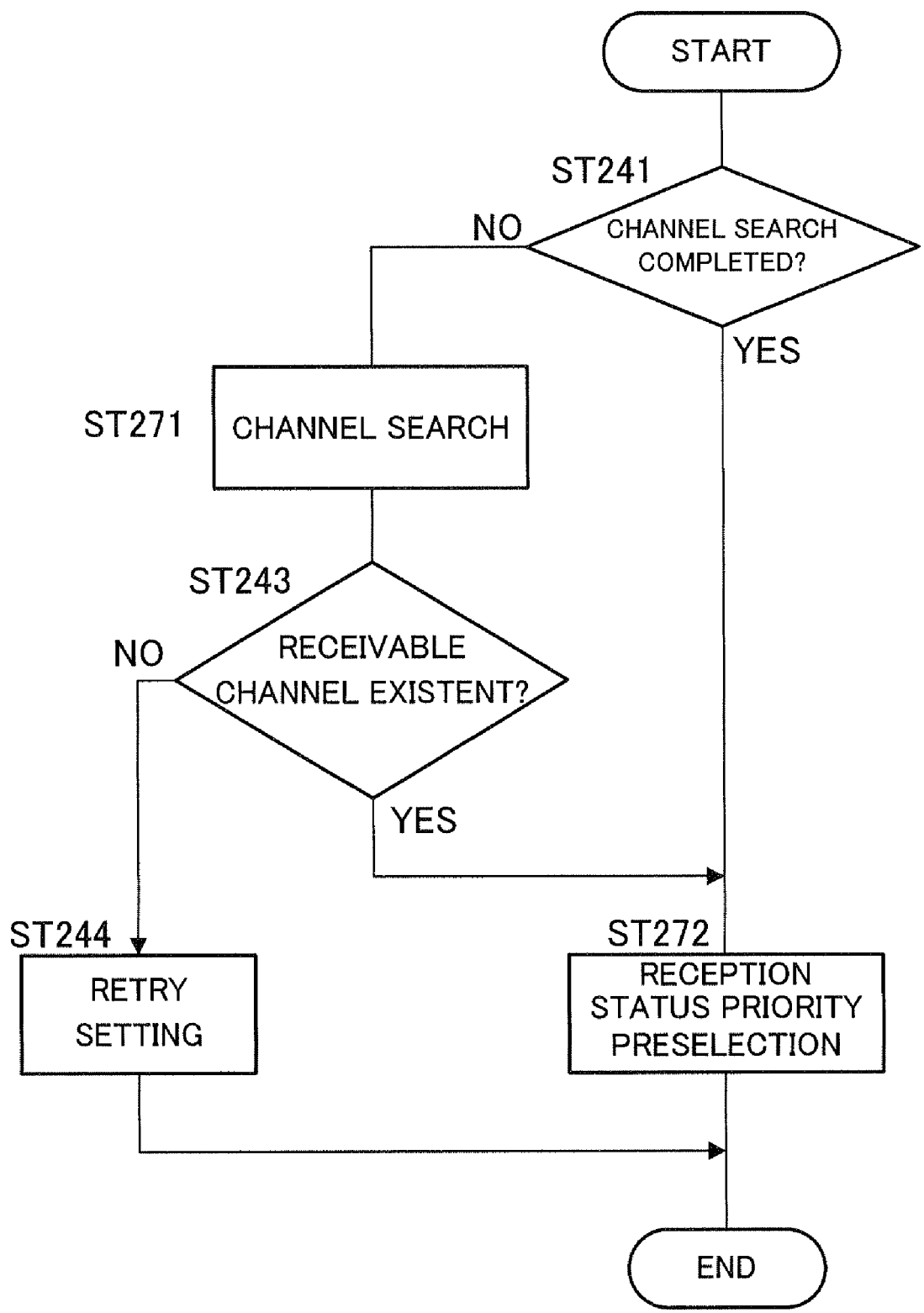
FIG. 15 is a flowchart showing the procedure of reception status priority preselection preparatory processing.

Next, reception status priority preselection preparatory processing will be described using FIG. 15. Parts in FIG. 15 common to FIG. 12 are assigned the same numerals as in FIG.

12, and duplicate descriptions are omitted. In ST271 in FIG. 15 a channel search is performed, and the processing flow proceeds to ST243.

In ST272, if it has been determined in ST241 that a channel search has already been performed, and if it has been determined in ST243 that there is a receivable channel, the channel with the highest reception level is set as preselection information, and reception status priority preselection preparatory processing is terminated.

Thus, according to Embodiment 1, when preselection preparatory processing is performed, preselection preparations are performed according to a preselection method specified at the time of preselection processing, and if that preselection preparatory processing fails, preselection preparatory processing is performed according to the preselection method with the next-highest ranking among ranked preselection methods, so that the possibility of recording a specified program is improved even if the broadcast area is different when preselection is performed and when recording is started, and preselection preparatory processing cannot be performed using the specified preselection method.

In this embodiment, current location preselection, program preselection, service preselection, broadcasting station preselection, affiliate preselection, remote controller number preselection, keyword preselection, and reception status priority preselection have been listed as preselection methods, but the present invention is not limited to this, and any of these preselection methods may be used.

In this embodiment it has been stated that, if preselection preparatory processing according to a preselection method specified at the time of preselection processing fails, preselection preparatory processing is performed according to the preselection method with the next-highest ranking among ranked preselection methods, but ranking of preselection methods may be in any order, and rankings may be changed by means of a user directive or the like.

In this embodiment, it has been stated that program information and broadcasting station information are acquired from a broadcast wave, but the present invention is not limited to this, and program information and broadcasting station information may also be acquired via the Internet or another network.

In a preselection method in which a service channel is not specified at the time of preselection processing, primary service recording may be performed, or TS recording may be performed.

If preselection preparatory processing according to the specified preselection method fails when the broadcast area is changed in line with movement at the time of startup, at the time of channel selection, during recording, or during viewing, or when the reception level degrades and broadcast reception on the specified channel becomes difficult, provision may be made for the channel to be switched automatically and recording or viewing to be continued by using a method whereby preselection preparatory processing is performed according to the preselection method with the next-highest ranking among ranked preselection methods.

Embodiment 2

Figure 16:
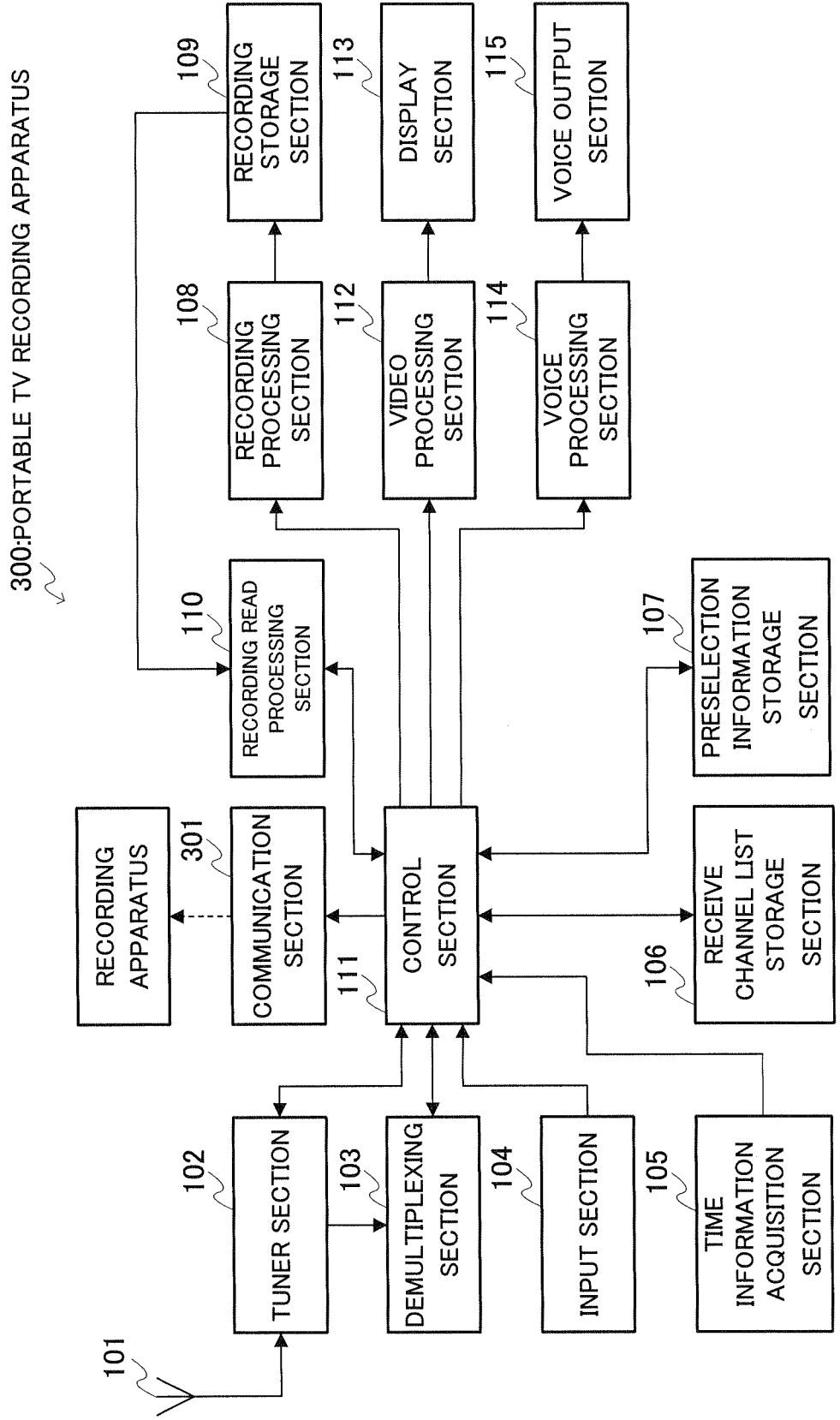
FIG. 16 is a block diagram showing the configuration of a portable TV recording apparatus according to Embodiment 2 of the present invention.

FIG. 16 is a block diagram showing the configuration of a portable TV recording apparatus 300 according to Embodiment 2 of the present invention. Parts in FIG. 16 common to FIG. 3 are assigned the same numerals as in FIG. 3, and duplicate descriptions are omitted. In FIG. 16, a communication section 301 receives control from control section 111 and performs infrared, Bluetooth, or suchlike short-range radio communication, or radio LAN (Local Area Network), LAN, or suchlike communication, and makes a recording request to another portable TV recording apparatus or a non-portable TV recording apparatus (hereinafter referred to as "external device").

Figure 17:
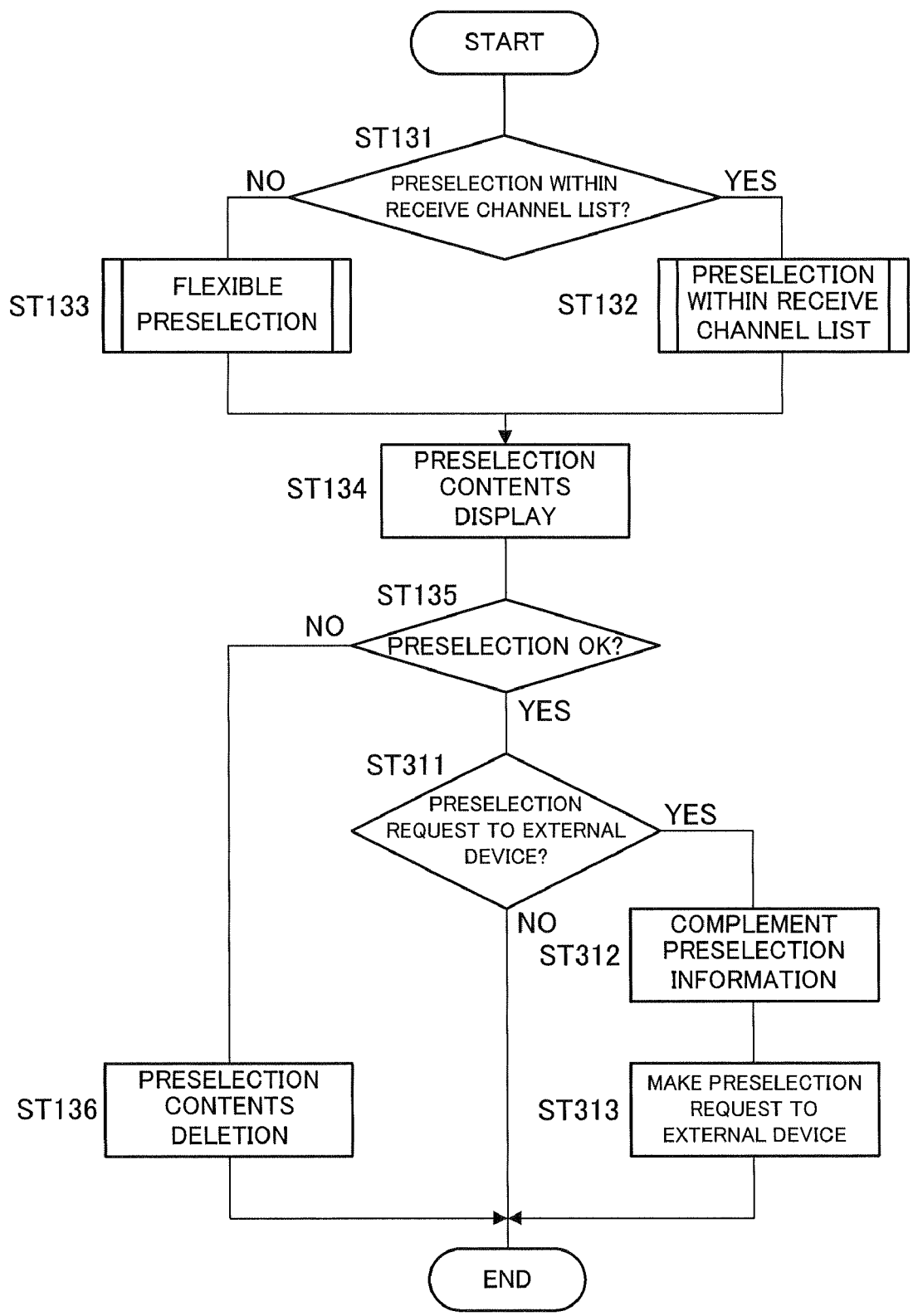
FIG. 17 is a flowchart showing preselection processing of the portable TV recording apparatus shown in FIG. 16.

Preselection processing of portable TV recording apparatus 300 with the above configuration will now be described using FIG. 17. Parts in FIG. 17 common to FIG. 5 are assigned the same numerals as in FIG. 5, and duplicate descriptions are omitted. In ST311 in FIG. 17, the user is asked whether or not a preselection request with the same preselection contents as displayed in ST134 is to be made to an external device. If a directive for a preselection request to an external device is received from the user, the processing flow proceeds to ST312, and if a preselection request directive is not received, portable TV recording apparatus 300 preselection is confirmed with the displayed preselection contents, and preselection processing is terminated.

In ST312 preselection preparatory processing is performed based on a receive channel list, and preselection information is complemented. Since there is little preselection information with "flexible preselection" and preselection is not possible with a typical external device, the information is complemented to enable preselection with an external device. To be specific, preselection information is created so that preselection information becomes program preselection or service preselection contents.

In ST313 a preselection request is made to the external device with the complemented preselection information and portable TV recording apparatus 300 preselection is also performed, and preselection processing is terminated.

Thus, according to Embodiment 2, by making a preselection request to an external device and by also performing preselection on a portable TV recording apparatus, recording can be performed dependably even if recording cannot be performed by the portable TV recording apparatus.

In the above embodiments, cases have been described in which preselection processing and preselection preparatory processing for recording preselection are performed, but the present invention is not limited to this, and can be similarly implemented when viewing preselection (TV playback preselection) is performed, and execution of preselection is mentioned in the Claims when recording or viewing is performed in accordance with preselection.

Also, in the above embodiments, the description has referred to a portable TV recording apparatus, but the present invention is not limited to this, and may also apply to a TV recording apparatus that can be installed in a vehicle or the like.

A first aspect of the present invention is a digital broadcast receiving apparatus that includes: a frequency channel selection section that receives a viewable broadcast wave on a frequency channel specified when recording or viewing is preselected, or prior to the start of preselection execution; and a channel search section that, if a viewable broadcast wave cannot be received on a frequency channel specified by the frequency channel selection section, performs a channel search, and acquires a frequency channel of a viewable broadcast wave.

A second aspect of the present invention is a digital broadcast receiving apparatus wherein, in the above aspect, if a broadcast wave of a specified frequency channel is not a broadcast wave from a broadcasting station on a previously selected frequency channel, the channel search section performs a channel search, and acquires a viewable broadcast wave and service channel.

According to these configurations, even if a digital broadcast receiving apparatus moves beyond a broadcast area, preselection can be performed on a channel corresponding to a destination broadcast area by performing a channel search.

A third aspect of the present invention is a digital broadcast receiving apparatus wherein, in an above aspect, if a viewable broadcast wave cannot be received, the channel search section repeatedly performs a channel search at fixed intervals until a viewable broadcast wave can be received.

According to this configuration, since a broadcast wave cannot be detected when out of range, repeatedly performing a channel search at fixed intervals enables a broadcast wave to be detected without delay after recovery from an out-of-range situation.

A fourth aspect of the present invention is a digital broadcast receiving apparatus wherein, in an above aspect, specification of a broadcasting station and a preselection execution start time and preselection execution end time is received when recording or viewing is preselected, and when recording preselection is executed, the entirety of a primary service or TS is recorded.

According to this configuration, by recording the entirety of a primary service or TS when recording preselection is executed, a user can omit service specification at the time of recording. Also, since it may not be possible to select a service of a destination broadcasting station if service information cannot be acquired, specifying recording of the entirety of a primary service or TS beforehand enables recording to be performed even if a service cannot be selected.

A fifth aspect of the present invention is a digital broadcast receiving apparatus wherein, in an above aspect, specification of an affiliate and a preselection execution start time and preselection execution end time is received when recording or viewing is preselected, and preselection is executed in accordance with the specified affiliate and preselection execution start time and preselection execution end time.

According to this configuration, a user need only specify an affiliate as a key station affiliate without identifying a destination broadcasting station, enabling the possibility of executing preselection for a desired program at the destination to be improved.

A sixth aspect of the present invention is a digital broadcast receiving apparatus wherein, in an above aspect, specification of a remote controller number and a preselection execution start time and preselection execution end time is received when recording or viewing is preselected, and preselection is executed in accordance with the specified remote controller number and preselection execution start time and preselection execution end time.

According to this configuration, in terrestrial digital broadcasting, since remote controller key assignment information that assigns frequency channels to remote controller keys is included in a broadcast wave, and remote controller key numbers are assigned to remote controller numbers, a user can, for example, execute preselection for a desired program when moving within an MFN by specifying a remote controller number, without identifying the name of a destination broadcasting station. Also, since the same remote controller number is often used by an affiliate, the possibility of executing preselection for a desired program at one's destination can be improved.

A seventh aspect of the present invention is a digital broadcast receiving apparatus wherein, in an above aspect, specification of a keyword and a preselection execution start time and preselection execution end time is received when recording or viewing is preselected, program information is acquired by means of a channel search performed prior to the start of preselection execution, and preselection is executed using a program that includes a keyword specified in the acquired program information and the preselection execution start time and preselection execution end time.

According to this configuration, the possibility of executing preselection for a desired program at one's destination can be improved by executing preselection with a program that includes a specified keyword, without a user identifying a destination broadcasting station or the like.

An eighth aspect of the present invention is a digital broadcast receiving apparatus wherein, in an above aspect, a broadcast wave is acquired by means of a channel search performed prior to the start of preselection execution, and reception is performed using the channel with the best reception status within an acquired broadcast wave.

According to this configuration, preselection can be executed dependably for any program within a broadcast area by performing reception using the channel with the best reception status within a broadcast wave acquired by means of a channel search.

A ninth aspect of the present invention is a digital broadcast receiving apparatus wherein, in an above aspect, if a broadcast wave of a specified frequency channel is not a broadcast wave from a broadcasting station in a preselection-time frequency channel, the channel search section performs a channel search, and acquires a viewable broadcast wave and service channel.

According to this configuration, even if a digital broadcast receiving apparatus moves beyond a broadcast area, preselection can be executed in a destination broadcast area by performing a channel search.

A tenth aspect of the present invention is a digital broadcast receiving apparatus wherein, in an above aspect, if a viewable broadcast wave cannot be received, the channel search section repeatedly performs a channel search at fixed intervals until a viewable broadcast wave can be received.

According to this configuration, since a broadcast wave cannot be detected when out of range, repeatedly performing a channel search at fixed intervals enables a broadcast wave to be detected without delay after recovery from an out-of-range situation.

An eleventh aspect of the present invention is a digital broadcast receiving apparatus wherein, in an above aspect, if preselection cannot be executed with the contents specified at the time of preselection, preselection is executed for a program already being broadcast or a program that is scheduled to be broadcast within a fixed period of time from the preselection execution start time or preselection execution end time, and that partially matches the contents specified at the time of preselection.

According to this configuration, since a program specified at the time of preselection is not necessarily broadcast in a destination broadcast area, by executing preselection for a program already being broadcast or a program that is scheduled to be broadcast within a fixed period of time from the preselection execution start time or preselection execution end time, and that partially matches the contents specified at the time of preselection, preselection can be executed for the specified program or a program whose contents are close to the specified program.

A twelfth aspect of the present invention is a digital broadcast receiving apparatus wherein, in an above aspect, if it is determined that preselection cannot be executed with the specified contents due to an out-of-range situation or a change of broadcast area, the determination result is reported to the user prior to the start of preselection execution.

A thirteenth aspect of the present invention is a digital broadcast receiving apparatus wherein, in an above aspect, if the specified contents are changed in line with a change of broadcast area, the fact that the preselection contents have been changed is reported to the user prior to the start of preselection execution.

According to these configurations, since a user can identify the fact that preselection cannot be executed with the specified contents due to an out-of-range situation or a change of broadcast area prior to the start of preselection execution, the user can take appropriate measures.

A fourteenth aspect of the present invention is a digital broadcast receiving apparatus wherein, in an above aspect, a preselection request including preselection contents is transferred to an external device that has a recording function.

According to this configuration, since recording can be performed on an external device that has a recording function, a desired program can be dependably recorded even if the desired program cannot be received in a destination broadcast area.

A fifteenth aspect of the present invention is a digital broadcast receiving apparatus wherein, in an above aspect, preselection preparations are performed according to a specified preselection method prior to the start of preselection execution, and if the preselection preparatory processing fails, preselection preparatory processing is performed according to the preselection method with the next-highest ranking to the specified preselection method among ranked preselection methods.

According to this configuration, even if preselection preparatory processing cannot be performed according to the specified preselection method due to movement beyond a broadcast area, the possibility of recording a specified program is improved by performing preselection preparatory processing according to the preselection method with the next-highest ranking to the specified preselection method among ranked preselection methods.

The present application is based on Japanese Patent Application No. 2004-288389 filed on Sep. 30, 2004, entire content of which is expressly incorporated herein by reference.

INDUSTRIAL APPLICABILITY

A digital broadcast receiving apparatus according to the present invention has an effect of acquiring a broadcast wave at the current location with a high degree of probability without using location information, even when moving beyond a broadcast area, and can be applied to a small portable terminal such as a mobile phone.

The invention claimed is:

1. A method comprising:
storing reservation information which includes a recording start time and a plurality of attributes of a first program specified to be recorded;
acquiring, prior to the recording start time, program information including one or more attributes associated with receivable programs;
deciding whether a second program having a same content as the first program is included in the receivable programs by:
generating a first indication of whether the second program is included in the receivable programs by comparing the one or more attributes associated with receivable programs with a first attribute of the plurality of attributes of the first program;
when the first indication does not indicate the second program is included in the receivable programs, generating a second indication of whether the second program is included in the receivable programs by comparing the one or more attributes associated with receivable programs with a second attribute of the plurality of attributes of the first program, the second attribute being different from the first attribute; and
deciding that the second program is included in the receivable programs when at least one of the first indication and the second indication indicates the second program is included in the receivable programs, wherein the acquiring and deciding are performed by one or more configured controllers; and
recording the second program if it is decided the second program is included in the receivable programs.

2. The method according to claim 1, wherein the first attribute and the second attribute are any two of a frequency channel, a remote controller number, a broadcasting station identifier, an affiliate identifier, a service channel, a program identifier and a keyword.

3. The method according to claim 1, wherein the program information is PSI (Program Specific Information) or SI (Service Information).

4. A method comprising:
storing reservation information associated with a first program specified to be reproduced, the reservation information including a reproducing start time and a plurality of attributes of the first program;
acquiring, prior to the reproducing start time, program information including one or more attributes associated with receivable programs;
deciding whether a second program having a same content as the first program is included in the receivable programs by:
generating a first indication of whether the second program is included in the receivable programs by comparing the one or more attributes associated with the receivable programs with a first attribute of the plurality of attributes of the first program;
when the first indication does not indicate the second program is included in the receivable programs, generating a second indication of whether the second program is included in the receivable programs by comparing the one or more attributes associated with the receivable programs with a second attribute of the plurality of attributes of the first program, the second attribute being different from the first attribute; and
deciding that the second program is included in the receivable programs when at least one of the first indication and the second indication indicates the second program is included in the receivable programs, wherein the acquiring and deciding are performed by one or more configured controllers; and
reproducing the second program if it is decided the second program is included in the receivable programs.

5. The method according to claim 4, wherein the first attribute and the second attribute are any two of a frequency channel, a remote controller number, a broadcasting station identifier, an affiliate identifier, a service channel, a program identifier and a keyword.

6. The method according to claim 4, wherein the program information is PSI (Program Specific Information) or SI (Service Information).

7. A digital broadcast receiving apparatus comprising:
a storing section configured to store reservation information of a first program specified to be processed, the reservation information including a recording start time and a plurality of attributes of the first program;

an acquiring section configured to acquire program information including one or more attributes associated with receivable programs;

a decision section configured to decide whether a second program having a same content as the first program is included in the receivable programs by:

generating a first indication of whether the second program is included in the receivable programs by comparing the one or more attributes associated with receivable programs with a first attribute of the plurality of attributes of the first program;

when the comparing does not indicate the second program is included in the receivable programs, generating a second indication of whether the second program is included in the receivable programs by comparing the one or more attributes associated with receivable programs with a second attribute of the plurality of attributes of the first program, the second attribute being different than the first attribute;

deciding that the second program is included in the receivable programs when at least one of the first comparison and the second comparison indicates the second program is included in the receivable programs; and a processing section configured to process the second program if it is decided the second program is included in the receivable programs.

8. The digital broadcast receiving apparatus according to claim 7, wherein the first attribute and the second attribute are any two of a frequency channel, a remote controller number, a broadcasting station identifier, an affiliate identifier, a service channel, a program identifier and a keyword.

9. The digital broadcast receiving apparatus according to claim 7, wherein the program information is PSI (Program Specific Information) or SI (Service Information).

10. The digital broadcast receiving apparatus according to claim 7 wherein the plurality of attributes included in the reservation information is ranked according to an order, and the first attribute has a higher rank than the second attribute.

11. The digital broadcast receiving apparatus of claim 7 wherein the processing section is configured to record programs and the processing of the second program comprises recording the second program.

12. The digital broadcast receiving apparatus of claim 7 wherein the processing section is configured to reproduce programs and the processing of the second program comprises reproducing the second program.

13. The method according to claim 1 wherein the plurality of attributes included in the reservation information is ranked according to an order, and the first attribute has a higher rank than the second attribute.

14. The method according to claim 4 wherein the plurality of attributes included in the reservation information is ranked according to an order, and the first attribute has a higher rank than the second attribute.

* * * * *